United States Patent [19]

Itoh et al.

[11] Patent Number: 5,617,115

[45] Date of Patent: Apr. 1, 1997

[54] WORD PROCESSING UNIT WITH DOCUMENT DISPLAY FUNCTION

[75] Inventors: Akira Itoh, Nagaokakyo; Hideo Terai, Kyoto; Kazuhiro Shiraga, Osaka, all of Japan

[73] Assignee: Matsushita Electric Industrial Co., Ltd., Osaka, Japan

[21] Appl. No.: 304,234

[22] Filed: Sep. 12, 1994

[30] Foreign Application Priority Data

Sep. 10, 1993 [JP] Japan .................................. 5-225506

[51] Int. Cl.⁶ .............................. G09G 5/22; G09G 1/14
[52] U.S. Cl. ............................ 345/141; 345/142; 345/143; 345/145; 395/786; 395/791; 382/177
[58] Field of Search .................................. 382/9; 345/25, 345/26, 141, 142, 143, 145, 192, 193, 194, 195; 395/101–117, 145, 150, 151

[56] References Cited

U.S. PATENT DOCUMENTS

| 4,491,933 | 1/1985 | Ursin et al. | 364/900 |
| 4,757,302 | 6/1988 | Hatakeyama et al. | 340/407 |
| 5,086,434 | 2/1992 | Abe et al. | 375/7 |
| 5,129,011 | 7/1992 | Nishikawa et al. | 382/9 |

*Primary Examiner*—Raymond J. Bayerl
*Assistant Examiner*—Kaniki C. Lockett
*Attorney, Agent, or Firm*—Price, Gess & Ubell

[57] ABSTRACT

A word processor with a document retrieval function which successively and continuously displays retrieved documents which have been converted into code information and stored in the code information storage unit, so that by using a buffer memory of just little capacity, documents can be consecutively displayed at high speed, or at a specified high speed, or otherwise such consecutive display suspended and the documents generated one by one at high speed. In order to achieve this, the original code information is reduced so as to contain just enough information for retrieval purposes, and having been stored in the buffer memory, is used in the successive generation of the display image.

33 Claims, 18 Drawing Sheets

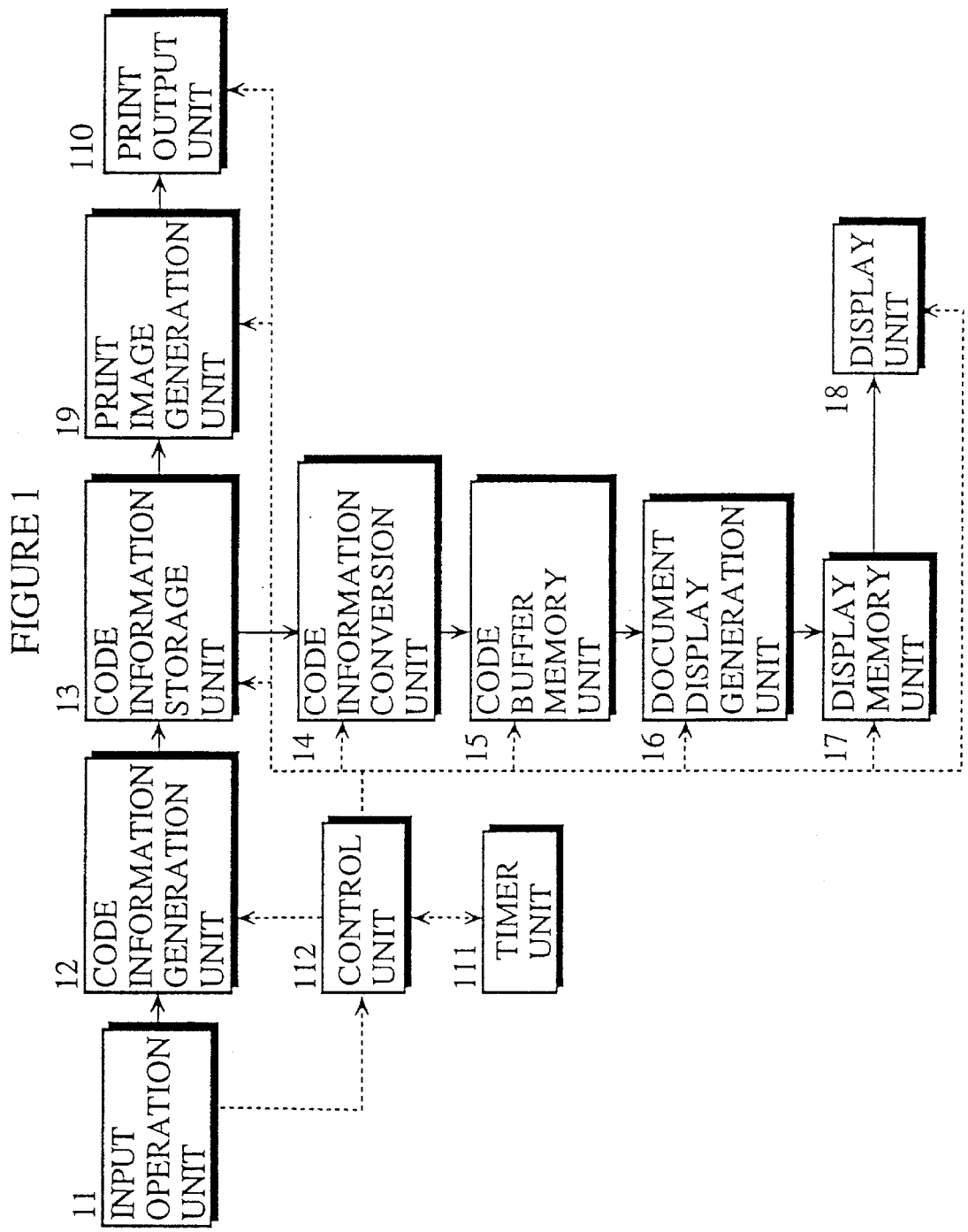

DOCUMENT CODE INFORMATION FORMAT

CHARACTER INFORMATION FIELD-DETAILED FORMAT OF ONE ELEMENT

CHARACTER-BASED LINE FIGURE INFORMATION FIELD-DETAILED FORMAT OF ONE ELEMENT

EXAMPLE OF CHARACTER BASED LINE FIGURE

DOCUMENT DISPLAY CODE INFORMATION FORMAT

DISPLAY CHARACTER ROW CODE INFORMATION FIELD-DETAILED FORMAT OF ONE ELEMENT

LINE END POINT INFORMATION FIELD-DETAILED FORMAT OF ONE ELEMENT

CREATION AND STORAGE OF DOCUMENT

PRINT OUTPUT OF DOCUMENT

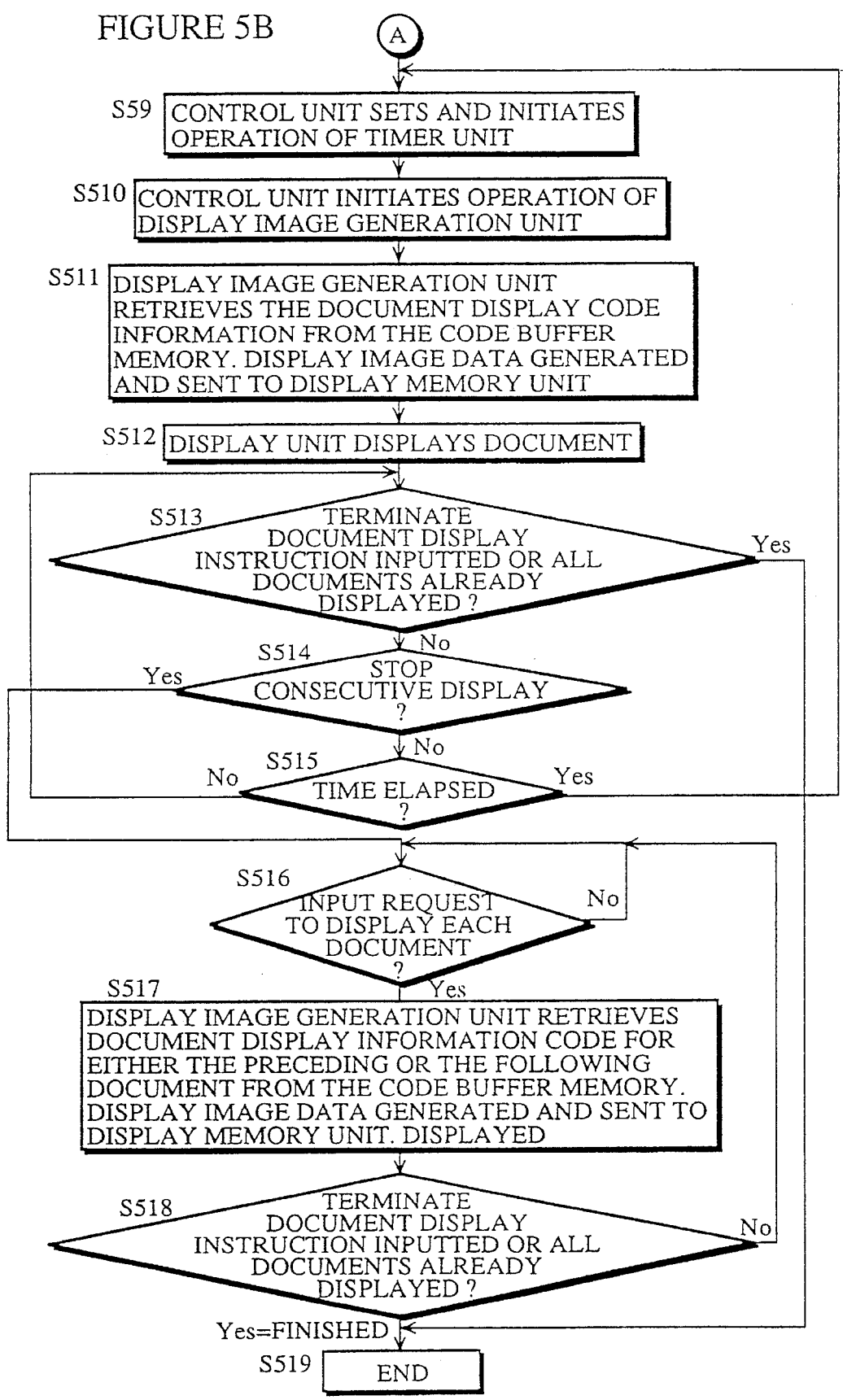

WORD PROCESSING UNIT WITH DOCUMENT DISPLAY FUNCTION

BACKGROUND OF THE INVENTION

1. Field of the Invention

The present invention relates to a word processor unit, more specifically, to a word processor unit with document display function which executes the document retrieval of a large number of created, edited, and stored documents and displays them as is necessary.

2. Description of the Related Art

Word processors use input devices, such as keyboards or mice, to input code information for text, tables and figures, and after editing, store the code information as it is. Here, code information, rather than being inputted as a unified data construction consisting of 2-dimensional graphic information (bit map image) using a scanner to read text and figures on a piece of paper, is inputted as character code data and attribute code data (such as character size, kind of character) for characters and tables, and as figure code data (figure type, end point position) and feature code data (line width, coloring-in) for figures, meaning a document consisting of a plurality of data constructions is inputted as code information.

The object of this kind of unit is usually to have the created document printed by a high resolution (for example 400 dots/inch (dpi)) printer on paper which can be of A4, or B4, or one of a variety of other sizes. Therefore, to create a high quality print output of the document, of which the appearance and quality are in line with the intentions of the operator, a large amount of attribute code data is inputted and stored at the same time as when the document is created. Moreover, the majority of documents created using word processors are inputted using character code as the base (character-based input being the mainstream, with graphics-based input being less common), so that the document is constructed of characters and character-based line figures (a figure constructed, not of bit map data, but of a sequence of line segments, each of which is defined as one single character). That is to say, a large amount of attribute code data for the various kinds of character decoration is added to the code data for each separate character, as well as the character code data array which shows the kind of line constructed for the character-based line figures described above. In this way, by taking a unified data construction for all different characters, then the data processing (such as deleting, inserting, copying, or moving) when creating and editing the document can be undertaken for the unified character information, facilitating high speed editing of the document. However, regardless of whether the stored information is in this form, otherwise known as code information, the amount of data for one document remains large.

On the other hand, the storage of a large amount of code is achieved by means of magnetic disks, such as flexible disks or optical magnetic disks which, while rather slow when compared to semiconductor memory, are inexpensive and can be removed, allowing easy management of data.

In order to view a desired document out of all of the documents stored in the converted form as code information, then it becomes desirable for the operator to make use of a word processor unit which uses a document retrieval unit whereby the operator can retrieve the document and visually examine it, with direct consecutive display using a display device such as a CRT or a liquid crystal display which, when compared to the printer output, has a small screen (for example, 640*400 pixels) with low resolution (for example, 100 dpi). To provide a document retrieval device which allows the operator to efficiently visually refer to the document, the following two conditions are necessary.

(1) Rather than providing an image of the same high quality as the final printed image which would take considerable time, the device should allow the operator to consecutively view the document, simplified or divided up to an extent which may be specified by the operator, at a given high speed.

(2) It should be possible for the operator to stop the consecutive display of the chosen document at a certain spot, and to have the preceding or the following document(s) generated one at a time at high speed.

Means for achieving the high-speed consecutive retrieval, which use scanners to input a 2-dimensional (bit map image) comprised of text, tables and images, and then display an expanded display of compressed image data have already been described at length (For example, U.S. Pat. No. 5,129,011 issued on Jul. 7, 1992). However, this has not been the case for a document retrieval unit where documents are input and stored as code information before being retrieved and consecutively displayed at high speed.

This has been mainly for the following two reasons:

(1) In reading the documents stored on magnetic disks in low-speed devices, in addition to the time taken to transmit the data, it is necessary to include the time taken for the reader head to find the correct location (seek time and rotation time), hence making the process time-consuming.

(2) Since the data is constructed so that attribute data is assigned to each separate character, in generating the display image it becomes necessary to read this attribute data for each character, and, having selected the font ROM etc. in accordance with this attribute data, to develop the bit map image, all-in-all a troublesome process which must be undergone for every character in the document, taking a considerable amount of time.

SUMMARY OF THE INVENTION

Therefore, the main object of this invention is to provide a word processor apparatus which, despite using a code information storage unit utilizing magnetic disks of low retrieval speed, can generate a consecutive, high speed display of retrieved documents which have been converted into code information.

The above object can be fulfilled by a word processor unit capable of converting documents which have been stored in the form of code information into image data for a print output, comprising: an input unit for inputting operator's document display instructions; a document storage unit for storing accumulated character information which is a unified form of a character code and an attribute code for each character in a document; a retrieval unit for retrieving the character information from the document storage unit; a display character code conversion unit for detecting character rows, extracting the character codes from the character information successively retrieved by the retrieval unit, for which a specified attribute exhibits an identical value, adding the respective identical attribute value to each of the detected character rows, and outputting display character code rows; code buffer memory for storing the display character code rows; a display image generation unit for retrieving the display character code rows from the code buffer memory and generating display image data; a display unit for displaying the generated display image data; and a control unit for having the retrieval unit retrieve the document from the document storage unit, for having the display character code conversion unit convert the code information into display character code rows to be stored in the code buffer memory, and for having the display image generation unit generate the display image data at a specified speed and display a display image.

The control unit may include a timer for establishing a generation time interval of a document display image, to have a display image of a following document generated whenever the time interval in the timer has elapsed.

The word processor unit may further comprise a display speed input unit for enabling an operator to specify a display speed for when the document is displayed, and wherein the timer may establish the time interval in accordance with a value given by the operator via the display speed input unit.

The display character code conversion unit may include a group division processing unit for dividing a retrieved set of code information into groups for which a specified attribute is identical and which are to be displayed consecutively; and a display code row generation unit for generating display character code information made up of only the character codes extracted from the set of character information for every group arranged into a display order, and the identical attribute information within the group.

The group division processing unit may include a retrieval unit for retrieving a set of character information for which character size is identical, by referring to attribute information, out of the character information retrieved by the retrieval unit from the document storage unit, when the attribute to be used by the group division processing unit in forming the groups is specified as character size.

The display code row generation unit may include an attribute information generation unit which generates as attribute information to be added to an array of character codes, information showing a character size for a character row, and for when the character row is displayed, information showing a display starting position and character interval information.

The document storage unit may be comprised of a magnetic disk; and the retrieval unit may be comprised of a magnetic disk head.

The input unit may include a first operation unit for specifying a group of display documents, a second operation unit for handling an indication for consecutive display, and a third operation unit for handling a display of one document only, and the control unit may include a first reference unit for referring as to whether there has been an indication specifying a group of display documents and a consecutive display indication created through an operation of the first operation unit and the second operation unit; a first control unit for initiating, only when instructed by the first reference unit, the retrieval unit and the display character code conversion unit, having the group of display documents retrieved from the document storage unit, and having the generated display character code rows stored in the code buffer memory; and a second control unit for having the display image generation unit initiated once the group of display documents have been stored in the code buffer memory, having the display code character rows of the documents retrieved consecutively for each separate document in order from the code buffer memory and then displayed by the display unit.

The control unit may further include a second reference unit for referring to whether the third operation unit is operated during the consecutive document display; and a third reference unit for referring to whether the third operation unit is operated after the consecutive document display has been terminated, and the second control unit may control a termination of the consecutive document display at an indication from the second reference unit, and may control, at an indication from the third reference unit, an initiation of the display image generation unit, having the display character code rows in the group of display documents retrieved for one document at a time from the code buffer memory, then the display character image generated and displayed.

The input unit may further include a fourth operation unit for inputting a display complete indication, whereby the second control unit terminates retrieval when the display complete indication is inputted from the fourth operation unit during the consecutive display operation, and has a document which was being displayed when the display complete indication was inputted continued being shown.

The control unit may include a timer for establishing a generation time interval of a document display image, to have a display image of a following document generated whenever the time interval in the timer has elapsed.

The word processor unit may further comprise a display speed input unit for enabling an operator to specify a display speed for when the document is displayed, and the timer may establish the time interval in accordance with a value given by the operator via the display speed input unit.

The display character code conversion unit may include: a group division processing unit for dividing a retrieved set of code information into groups for which a specified attribute is identical and which are to be displayed consecutively; and a display code row generation unit for generating display character code information made up of only the character codes extracted from the set of character information for every group arranged into a display order, and the identical attribute information within the group.

The group division processing unit may include a retrieval unit for retrieving a set of character information for which character size is identical, by referring to attribute information, out of the character information retrieved by the retrieval unit from the document storage unit, when the attribute to be used by the group division processing unit in forming the groups is specified as character size.

The display code row generation unit may include an attribute information generation unit which generates as attribute information to be added to an array of character codes, information showing a character size for a character row, and for when the character row is displayed, information showing a display starting position and character interval information.

The document stored in the document storage unit may include figures as well as characters, with the figures being comprised of a combination of character-based line figures, each element being a size of one character, with figure information for every character-based line figure being comprised of a combination of a figure code and an attribute code, and the word processor unit may further comprise: a character/figure determination unit for referring to the character/figure information retrieved by the retrieval unit and determining whether the character/figure information is character information or figure information, and, when the character/figure information is the character information, having the retrieved data sent on to the display character code conversion unit; and a display figure code conversion unit for detecting a set of figure information which describes one continuous line out of the retrieved data determined to be the figure information by the character/figure determination unit, and at same time seeking out end points of a line described by the figure information, and generating starting position information and ending position information as a display figure code, whereby the code buffer memory may store the display figure code in a different field to the display character code.

The control unit may include a timer for establishing a generation time interval of a document display image, to have a display image of a following document generated whenever the time interval in the timer has elapsed.

The word processor unit may further comprise a display speed input unit for enabling an operator to specify a display speed for when the document is displayed, and the timer may establish the time interval in accordance with a value given by the operator via the display speed input unit.

The input unit may include a first operation unit for specifying a group of display documents, a second operation unit for handling an indication for consecutive display, and a third operation unit for handling a display of one document only, and the control unit may include: a first reference unit for referring as to whether there has been an indication specifying a group of display documents and a consecutive display indication created through an operation of the first operation unit and the second operation unit; a first control unit for initiating, only when instructed by the first reference unit, the retrieval unit, the display character code conversion unit, and the display figure code conversion unit, having the group of display documents retrieved from the document storage unit, and having generated display character code rows and/or generated display figure code rows stored in the code buffer memory; and a second control unit for having the display image generation unit initiated once the group of display documents have been stored in the code buffer memory, having the display code character rows and/or the display figure code rows of the documents retrieved consecutively for each separate document in order from the code buffer memory and then displayed by the display unit.

The control unit may further include: a second reference unit for referring to whether the third operation unit is operated during the consecutive document display; and a third reference unit for referring to whether the third operation unit is operated after the consecutive document display has been terminated, and the second control unit may control a termination of the consecutive document display at an indication from the second reference unit, and may control, at an indication from the third reference unit, an initiation of the display image generation unit, having the display character code rows and/or the display figure code rows in the group of display documents retrieved for one document at a time from the code buffer memory, then the image data for display use generated and displayed.

The input unit may further include a fourth operation unit for inputting a display complete indication, whereby the second control unit terminates retrieval when the display complete indication is inputted from the fourth operation unit during the consecutive display operation, and has a document which was being displayed when the display complete indication was inputted continued being shown.

The above object can also be fulfilled by a word processor unit capable of converting documents which have been stored in the form of code information into image data for a print output, comprising: an input unit for having a display indication specifying a group of documents to be displayed inputted; document storage unit for storing accumulated character information which is a unified form of a character code and an attribute code for each character in a document; a retrieval unit for retrieving character information from the document storage unit; a display character code conversion unit for detecting character rows, extracting the character codes from the character information successively retrieved by the retrieval unit, for which a specified attribute exhibits an identical value, adding the respective identical attribute value to each of the detected character rows, and outputting display character code rows; code buffer memory for storing the display character code rows; a first control unit for initiating, when there is a display indication from an operator, the retrieval unit, and the display code conversion unit, having all of the documents specified to be displayed by the operator retrieved from the document storage unit, converted into display character code and stored in the code buffer memory; a display image generation unit for retrieving the display character code from the code buffer memory and generating display image data: a display unit for displaying the generated display image data; and a second control unit for initiating the display image generation unit and the display unit once a predetermined amount of display character codes has been stored in the code buffer memory, and having the display image data displayed at a specified speed.

The second control unit may include an observation unit for observing whether all of the data for the set of documents specified by the operator to be displayed has been stored in the code buffer memory, and initiating the display image generation unit when all of the data for the documents to be displayed has been stored.

The second control unit may further include a timer for establishing a generation time interval of a document display image, to have a display image of a following document generated whenever the time interval in the timer has elapsed.

The word processor unit may further comprise a display speed input unit for enabling an operator to specify a display speed for when the document is displayed, and wherein the timer establishes the time interval in accordance with a value given by the operator via the display speed input unit.

The input unit may include a first operation unit for specifying a group of display documents, a second operation unit for handling an indication for consecutive display, and a third operation unit for handling a display of one document only, and the first control unit may include: a first reference unit for referring as to whether there has been an indication specifying a group of display documents and a consecutive display indication created through an operation of the first operation unit and the second operation unit, and the first control unit may initiate, only when instructed by the first reference unit, the retrieval unit and the display character code conversion unit, having the group of display documents retrieved from the document storage unit, and having a generated display character code row stored in the code buffer memory, and the second control unit may have the display image generation unit initiated once the group of display documents have been stored in the code buffer memory, having the display code character rows of the documents retrieved consecutively for each separate document in order from the code buffer memory and then displayed by the display unit.

The second control unit may further include: a second reference unit for referring to whether the third operation unit is operated during the consecutive document display; and a third reference unit for referring to whether the third operation unit is operated after the consecutive document display has been terminated, and wherein the second control unit may control a termination of the consecutive document display at an indication from the second reference unit, and may control, at an indication from the third reference unit, an initiation of the display image generation unit, having the display character code rows in the group of display documents retrieved for one document at a time from the code buffer memory, then the display character image generated and displayed.

The input unit may further include a fourth operation unit for inputting a display complete indication, whereby the second control unit terminates retrieval when the display complete indication is inputted from the fourth operation unit during the consecutive display operation, and has a document which was being displayed when the display complete indication was inputted continued being shown.

The document stored in the document storage unit may include figures as well as characters, with the figures being comprised of a combination of character-based line figures, each element being a size of one character, with figure information for every character-based line figure being comprised of a combination of a figure code and an attribute code, and the word processor unit may further comprise: a character/figure determination unit for referring to the character/figure information retrieved by the retrieval unit and determining whether the character/figure information is character information or figure information, and, when the character/figure information is the character information, having the retrieved data sent on to the display character code conversion unit; and display figure code conversion unit for detecting a set of figure information which describes one continuous line out of the retrieved data determined to be the figure information by the character/figure determination unit, and at same time seeking out end points of a line described by the figure information, and generating starting position information and ending position information as a display figure code, whereby the code buffer memory may store the display figure code in a different field to the display character code.

The input unit may include a first operation unit for specifying a group of display documents, a second operation unit for handling an indication for consecutive display, and a third operation unit for handling a display of one document only, and the first control unit may include: a first reference unit for referring as to whether there has been an indication specifying a group of display documents and a consecutive display indication created through an operation of the first operation unit and the second operation unit; a first control unit for initiating, only when instructed by the first reference unit, the retrieval unit, the display character code conversion unit, and the display figure code conversion unit, having the group of display documents retrieved from the document storage unit, and having the generated display character code rows and the generated display figure code rows stored in the code buffer memory; and a second control unit for having the display image generation unit initiated once the group of display documents have been stored in the code buffer memory, and having the display code character rows and/or the display figure code rows of the documents retrieved consecutively for each separate document in order from the code buffer memory and then displayed by the display unit.

The first control unit may further include: a second reference unit for referring to whether the third operation unit is operated during the consecutive document display; and a third reference unit for referring to whether the third operation unit is operated after the consecutive document display has been terminated, and wherein the second control unit may control a termination of the consecutive document display at an indication from the second reference unit, and may control, at an indication from the third reference unit, an initiation of the display image generation unit, having the display character code rows and/or the display figure code rows in the group of display documents retrieved for one document at a time from the code buffer memory, then the display image data generated and displayed.

The input unit may further include a fourth operation unit for inputting a display complete indication, whereby the second control unit terminates retrieval when the display complete indication is inputted from the fourth operation unit during the consecutive display operation, and has a document which was being displayed when the display complete indication was inputted continued being shown.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 is a block diagram constructed in accordance with the embodiment of the present invention, a word processor apparatus;

FIG. 5B is a flowchart showing the document retrieval process as far as the stage whereby the consecutive document display or page-by-page document display is completed for the present embodiment;

DESCRIPTION OF THE PREFERRED EMBODIMENT

Figure 2A:
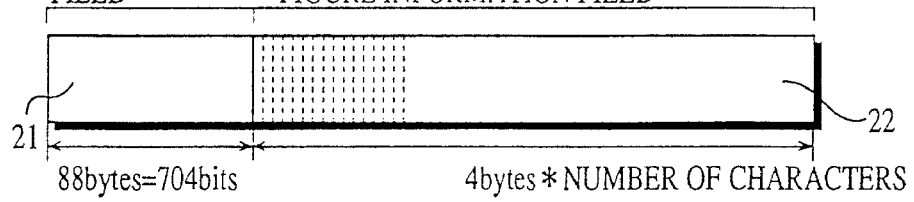
FIG. 2A is a constructed table showing the format of the code information which is constructed for the characters and the character-based line figures, constructed of lines comprised as the combination of line segments each defined as being one character (not bit map data, rather character-based lines), retrieved by the code information conversion unit from the code information storage unit under the present embodiment.

The following is an explanation of the embodiment of the present invention with reference to the drawings, FIGS. 1 through 8D.

FIG. 1 is a block diagram constructed in accordance with the embodiment of the present invention, a word processor unit. In this drawing, 11 represents the input operation unit, for example, a keyboard or a mouse, whereby the operator inputs text, tables and figures as input data as well as control instructions, while 12 is the code information generation unit which generates the code information of the text, tables and figures in accordance with the input data received from the input operation unit. For such characters as Chinese characters, Roman letters or numerals, the character code data, and the attribute code data which indicates the style of each character to be used on becoming a print output (character size, underlining, shading/cross-out lines, character style, character rotation, character modification) are generated in accordance with the input from the input operation unit 11, and, if there is a table or box in the text constructed as a character-based line figure (a figure constructed of line segments, each of which is defined as one single character), then the character code data which indicates the kind of line segment (whether a top, bottom, left-side, or right-side line, or a combination of them) and the attribute code data (line thickness, kind of line) is also generated. Additionally, if there is a figure constructed as bit map data, then it will generate the bit map data to be used when printing and the figure position on the printer paper.

13 is the code information storage unit which accumulates and stores the code information outputted from the code information generation unit 12, and whilst the transmission speed is rather low in comparison to semiconductor memory, makes use of magnetic storage disks such as low cost flexible disks which, as a removable medium, allow for convenient data management. For example, if the maximum number of texts which can be stored on one disk is 100, and the data capacity for one text is 10 KB, then a total of 1 MB of code information can be stored.

14 is the code information conversion unit which retrieves the code information of the texts stored in the code information storage unit 13 and converts it into information code for document display. The objective of this conversion is to generate code information which is smaller in size than the original, so that the information code for a large number of documents to be displayed can be stored in the code buffer memory unit described below. To achieve this, instead of generating code information of the same quality as the highly detailed final print output, it converts the data into a form simplified to an extent which may be specified by the viewer whereby the document display generation unit described below can generate this converted information code consecutively at a given high speed. The code information conversion unit in this embodiment gathers together the character code and the attribute code for each character and combines them into display character row code information showing the display image character rows for characters of the same size. The display character row code information is constructed of the character size, the position of the first character in the character row (the top left corner bit of the opening character in the display memory), the character interval, and the character code row. Also, in the case of the character-based line figure, the information code consisting of the character code showing the kind of line segment and the attribute code for one character unit to be combined are simplified to being the position information of two points (beginning and end) of each line on the display, with all of the information about the kind of line or its thickness being erased. That is to say, all lines in the display are shown as a standard width. Also, when there is a figure constructed of bit map data, then the code information for this bit map data is converted into bit map data reduced to the display screen size, and the position information on the display screen.

15 is the code buffer memory unit constituted of semiconductor memory which stores the information code for the document display outputted by the code information conversion unit 14. When constructed, for example, of one 4 Mbit DRAM memory chip, it has a capacity of 512 KB.

16 is the document display generation unit which retrieves the information code for the document display stored in the code buffer memory unit 15 and successively generates the display image data. If it is deemed necessary when interpreting the code information for the document display, it may retrieve the font data from the font ROM memory and, having generated the contracted font data, sent it on to the display memory unit described below. If there is an aforementioned character-based line figure to be generated, then the bit map data for the lines connecting the line end points is transmitted to the display memory unit described below. Finally, if there is an aforementioned bit map data figure to be generated, then it transmits this bit map data onto the display memory unit described below once it has been formed.

17 is the display memory unit which stores the display image data outputted by the document display generation unit 16, in other words constructed as VRAM (Video RAM), with its capacity dependent on the resolution of the display unit described later, for example being 32 KB for a 640 * 400 pixel monochrome display.

18 is the display unit which depicts an image based on the data stored in the display memory unit 17, comprised of a CRT or a liquid crystal display. The resolution of this unit will for example, be 100 dpi, when the screen is 640 * 400 pixels.

19 is the print image generation unit which creates the print output image data for the code information of the document stored in the code information storage unit 13. This faithfully reproduces all of the code information stored in the code information storage unit 13 in the print image. In other words, it generates high detail/high quality print image data by considering all of the attribute codes for characters (character size, underlining, shading/cross-out lines, character style, character rotation, character decoration) and the attribute codes for character-based line figures such as tables and boxes in the text (line thickness, kind of line).

110 is the print output unit which prints on paper the image data outputted by the print image generation unit 19, with its resolution being, for example, 400 dpi.

111 is a timer unit which sets the generation time interval of a document display image according to the instructions of the operator, having, under consecutive document display, the display image of the following document displayed whenever this time interval has elapsed.

112 is a control unit which controls the code information generation unit 112, the code information storage unit 13, the code information conversion unit 14, the code buffer memory unit 15, the document display generation unit 16, the display memory unit 17, the display unit 18, the print image generation unit 19, the print output unit 110, and the timer unit 111, with regard to input control instructions from the input operation unit 11.

FIG. 2A is a constructed table showing the format of the character code information created by the code information conversion unit 14 from the characters and the character-based line figures which, (as opposed to bit map figures) are lines constructed from elements defined as single characters, retrieved from the code information storage unit 13 in the present embodiment. In other words, it is a constructed table showing the format of the document code information generated by the code information generation unit 12.

In this drawing, the code information of the text is constructed of the format information field 21 and the character/character-based line figure information field 22. 21 is the format information field which defines in detail the appearance of the text. More precisely, the size of printer paper (A4, A3, B5, B4, free size), the paper direction (upright or horizontal), the size of the paper when using free size, the number of characters on one line, the number of lines on one page, the size of the top, bottom, left, and right margins, the spacing between characters, and the spacing between the lines are specified in this field. 22 is the character/character-based line figure information which defines the characters, and the character-based line figures which are lines constructed from elements defined as single characters. The code information for each single character is made up of 4 bytes (32 bits).

Figure 2B:
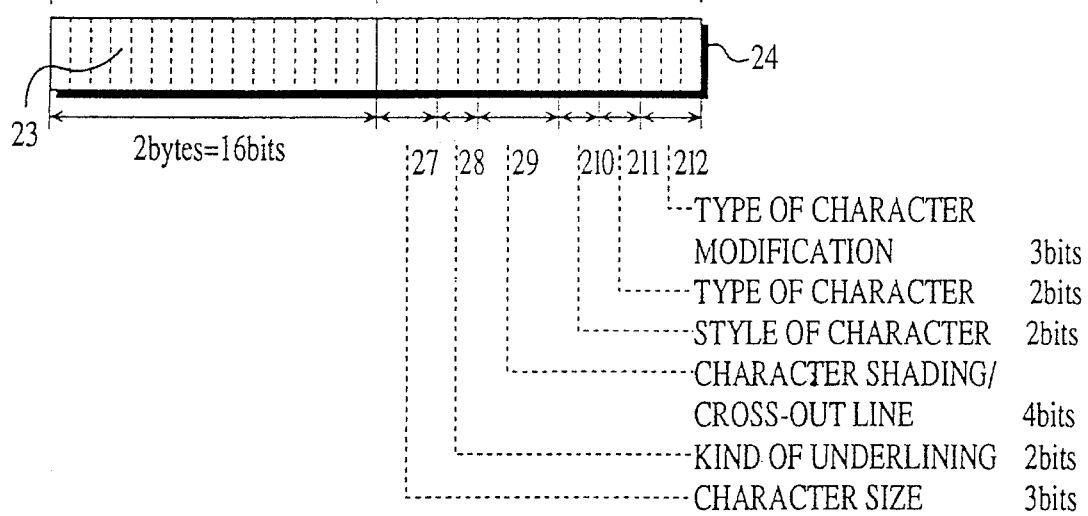
FIG. 2B is a constructed table showing the detailed format of one element of character information in the character/character-based line figure information field shown in FIG. 2A.
Figure 2C:
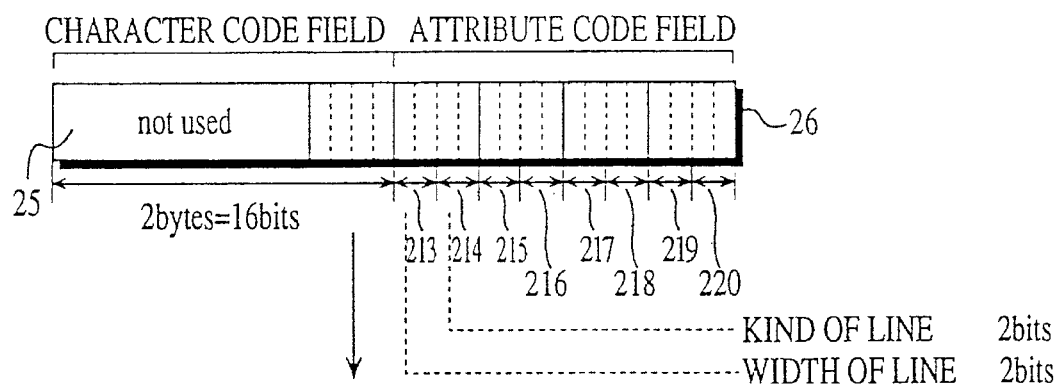
FIG. 2C is a constructed table showing the detailed format of one element of character-based line figure information in the character/character-based line figure information field shown in FIG. 2A.
Figure 2D:
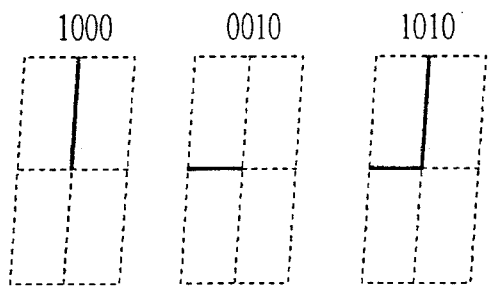
FIG. 2D is a line drawing showing an example of one character-sized element of a character-based line figure as defined by FIG. 2C.

FIG. 2B is a constructed table which shows the detailed format of character information housed in one element of the character/character-based line figure field 22 shown in FIG. 2A. Additionally, FIG. 2C is a constructed table which shows the detailed format of character-based line figure information housed in one element of the character/character-based line figure field 22 shown in FIG. 2A. As shown in these drawings, when the code information in the character/character-based line figure field relates to a character, 2 bytes consist of the character code field 23, with the other 2 bytes forming the attribute code field 24, while when it relates to a character-based line figure, 2 bytes consist of the character code field 25 (only 4 bits are used), with the other 2 bytes forming the attribute code field 26. The distinction between whether the code field relates to a character or to a character-based line figure can be made by setting every element aside the 4 valid ones in the character code field for character-based line figures to 1 (the bits indicated as "not used" in the drawing) and then making the distinction by examining this character code field.

Within the attribute code field 24, 27 defines the character size. In this present embodiment, this field consists of 3 bits which define character size out of a total of 5 types; a standard size, a narrow size (half of the width of the standard size), a broad size (double the width of the standard size), a tall size (double the height of the standard size), and a quadruple size (double the height and width of the standard size). 28 defines the kind of underlining to be used with the character. This field consists of 2 bits which indicate one of 4 kinds of underlining; none, standard underline, broken line, or dotted line. 29 defines the kind of shading or cross-out line to be used. In the present embodiment, nine different kinds of shading; none, large point mesh, fine point mesh, large mesh horizontal line, fine mesh horizontal line, large mesh diagonal line, fine mesh diagonal line, large mesh vertical line, and fine mesh vertical line, and 5 kinds of cross-out lines; none, horizontal solid line, horizontal double line, horizontal wavy line, or vertical double line. This means a total of 14 variations can be defined, so that this field is represented by 4 bits. 210 defines the style of the text. In the present embodiment, using Japanese characters, one of the following four styles; Ming-cho type face, Gothic, rounded Gothic, or brush-written is defined. This field consists of 2 bits. 212 defines the other decorative features of the character. In the present embodiment, this defines one of the following 5 kinds; none, bold character, inverse video, shadow, or italic character, and consists of 3 bits.

When the character code field 25 represents a character-based line figure, the 4 valid bits are set respectively so as to show, starting from the center of the character, an upward line, a downward line, a left line and a right line. As shown in the FIG. 2D, one character space is defined as four equal areas, with the upward line tracing the center line between the top two areas, the downward line tracing the center line between the bottom two areas, the left line tracing the center line between the two left-side areas, and the right line tracing the center line between the two right-side areas. This is defined for each character-sized line element separately, while within the attribute code field 26 for the character-based line figure, 213 defines the width of the upward line. In the present embodiment the following four widths; standard, fine, broad, extra broad can be defined, with this information comprising 2 bits. 214 defines the kind of line used in the upward line segment. In the present embodiment the following 4 kinds of line; solid, double, wavy, or broken can be defined, with this information comprising 2 bits. In the same way, 215 defines the kind of line used in the downward line segment, and 216 the width of the downward line, while 217 defines the kind of line used in the left line segment, and 218 the width of the left line, and 219 defines the kind of line used in the right line segment, and 218 the width of the right line.

In this way, whether a character or a character-based line figure is defined, the code information needed to show the composition of each single character is 4 bytes, so that if there is a text comprised of 1,000 characters (including characters and character-based line figures), then the contents of the code information will be at least 4,000 bytes.

In these drawings, the case whereby a figure constructed as bit map information is not included in the text is shown, but when one is present, then the bit map figure information field is prepared after the character/character-based line figure information fields by combining the position of the bit map figure frame on the printer paper and the bit map data.

Figure 3A:
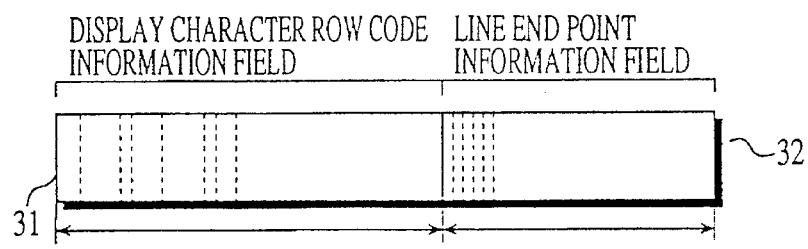
FIG. 3A is a constructed table showing the format of the document display code information consisting of the converted code information for the document made up of characters and character-based line figures.

In FIG. 3A a constructed table which shows the format of the document display information code which is the outputted result of the code information converted by the information code conversion unit 14, comprising characters and character-based line figures which, (as opposed to bit map figures) are lines constructed from elements defined as single characters. This code information is stored in the code buffer memory 15 as the entire document display text which is successively retrieved by the document display generation unit 16 in generating the display image.

In this drawing, the information code for the document display is constructed from the display character row code information field 31 and the line end point information field 32.

The display character row code information field 31 shows the combined elements of the character components of the text which are of the same size (whether standard, narrow, broad, tall, or quadruple) as one element of the display image character row code, and, by taking all of these elements together (when using successive display), expresses the textual part of the document.

Figure 3B:
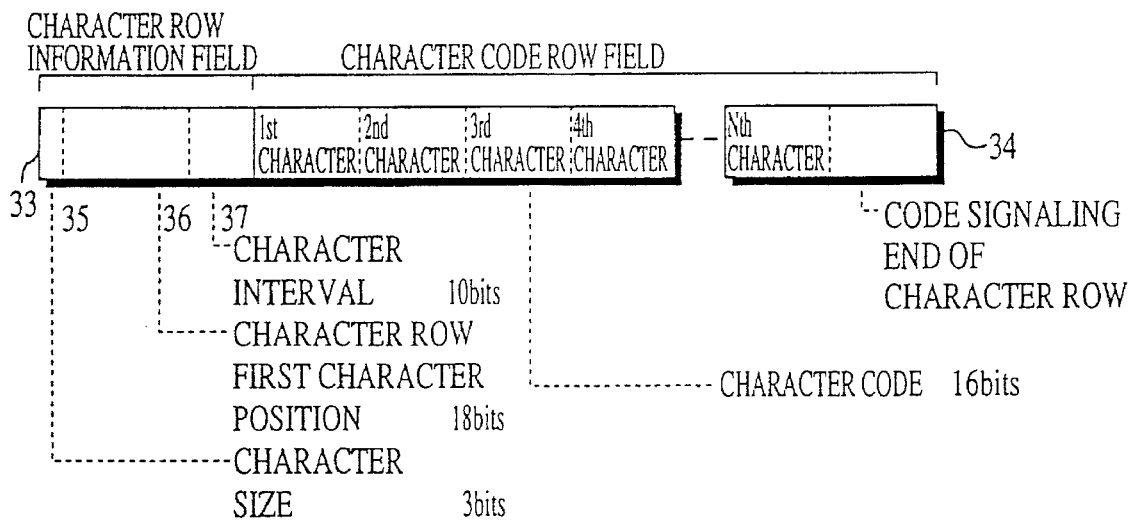
FIG. 3B is a constructed table showing the detailed format of one element in the display character row information field as shown in FIG. 3A.

FIG. 3B is a constructed table showing the detailed format of one element in the display character row code information field 31 shown in FIG. 3A, with one element in this field consisting of a character row information field 33 and a character code row field 34.

The character row information field 33 defines the display character row information comprised of the character size, the position of the first character, and the character interval for the display image character row. The character size, as defined in 35, is shown by 3 bits to be one of the following sizes; standard (for example, an 8 * 8 pixel character on the display), narrow, broad, extra broad, or quadruple. The character row first character position shows the position of the top-left corner bit of the first character in the character row to be stored in the display memory unit 17. This is defined by 36, and when the display memory is 32 KB (=640 * 400 pixels), since it is necessary to specify the bit position within the byte boundary, then 15+3=18 bits are necessary. The character interval shows the interval between the top left corner bits of successive characters. This is defined by 37, and in the present embodiment, when the display width is a maximum of 640 pixels, consists of 10 bits.

The character code row field 34 is the field which lists the precise character codes of the characters in the character row defined by the character row information field 33. The value N in this drawing is a positive integer, less than or equal to the maximum number of characters on one line, which shows the number of characters which belong to the character row. The specifying code that signals the end of the character row is added at the end as the final part of this character field. The amount of data in the character code row field 34 is given as 16 * (N+1) bits.

In this way, the original character code information and the attribute code data (to put it plainly, the attribute details only necessary when finally printing the data) for each character are expressed in the form of character row code information, when displaying using character size as the only important attribute of consecutive characters (character style being expressed in this one criterion only, and not in underlining, shading/cross-out lines, character rotation or character decoration).

Figure 3C:
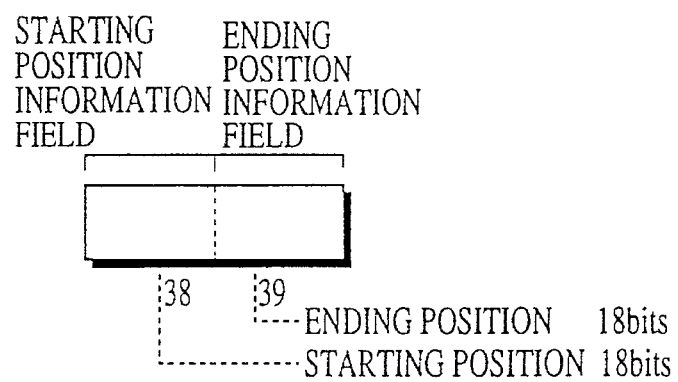
FIG. 3C is a constructed table showing the detailed format of one element in the line end point information field as shown in FIG. 3A.

FIG. 3C is a constructed table showing the detailed format of one element of the line end point information field 32 shown in FIG. 3A. The line end point information field 32 shows all of the line segments for character-based line figures and converts every kind of line into a solid line of a standard type and width. As shown in FIG. 3C, this is defined for one line in the line starting position information field 38 and the line ending position information field 39. Since the starting position and ending position indicate a drawing position within the 32K byte display memory, including the bit position inside the byte boundary, 18 bits are necessary. In the present drawing, the case whereby a figure constructed as a bit map is not included is shown, but when such a figure is included, then the bit map figure frame position on the display screen and the bit map data (the bit map data reduced according to the ratio of the size of the display screen to the size of the printer paper) are combined to form one element of the bit map figure information field.

In this way, the code information of the document showing characters as the basic unit is changed so that for characters, lines of characters of the same size and same interval are treated as a single unit with reduced attribute code information, and for character-based line figures, only the end point information code is stored. By doing this, it becomes possible to achieve the reduction of a large amount of code information and to store this reduced amount of document display data in a low capacity buffer memory.

Additionally, by converting the data into character row code for rows consisting of characters of the same size and interval, the actual display data is generated. This means the document display generation unit 16 becomes able to omit unnecessary judgements (handling the attribute information) in handling the characters rows and can merely repeat the same process (reading the font ROM, reducing the font, and transmitting it to the display memory unit 17). This means that the document display generation unit 16 can generate the document display at a higher speed.

Figure 4A:
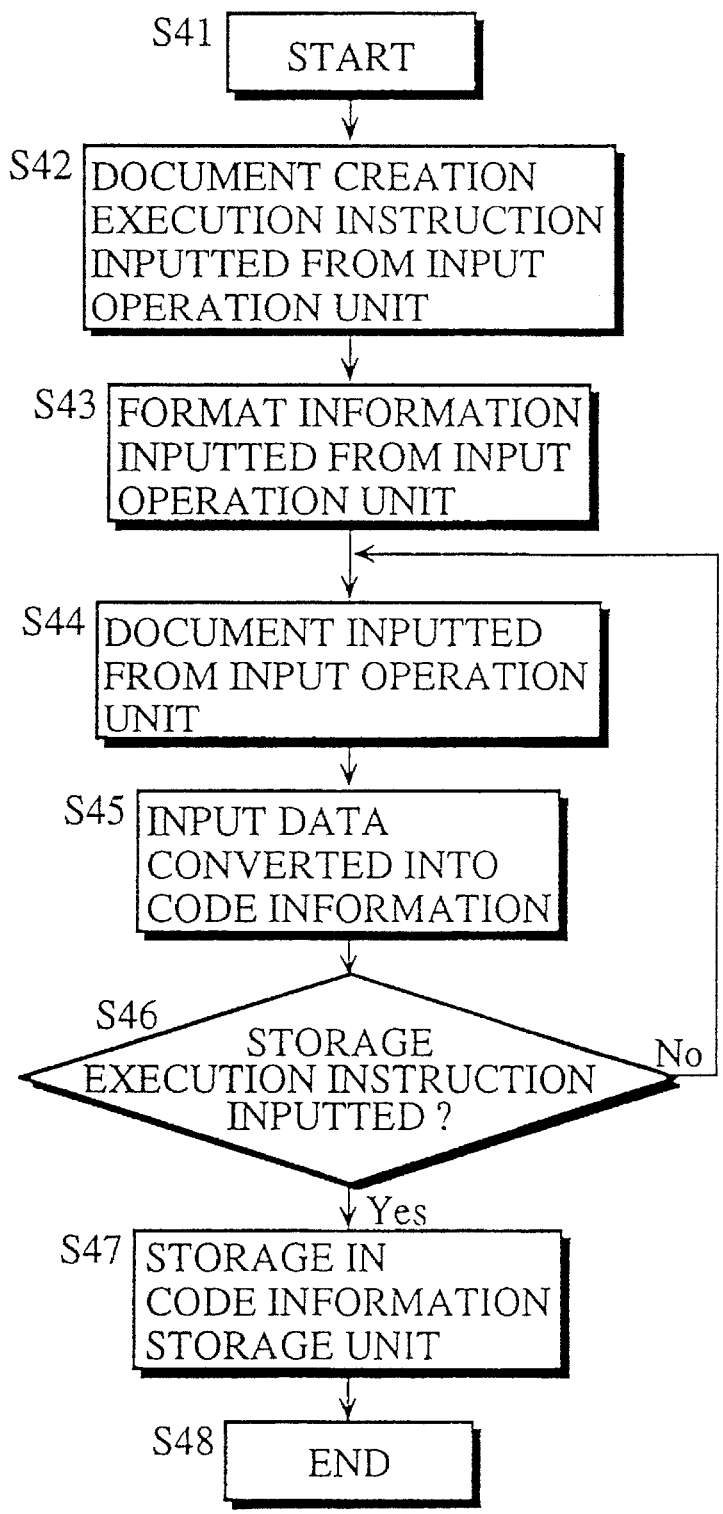
FIG. 4A is a flowchart showing the process of the creation and storage of the document in the present embodiment.
Figure 4B:
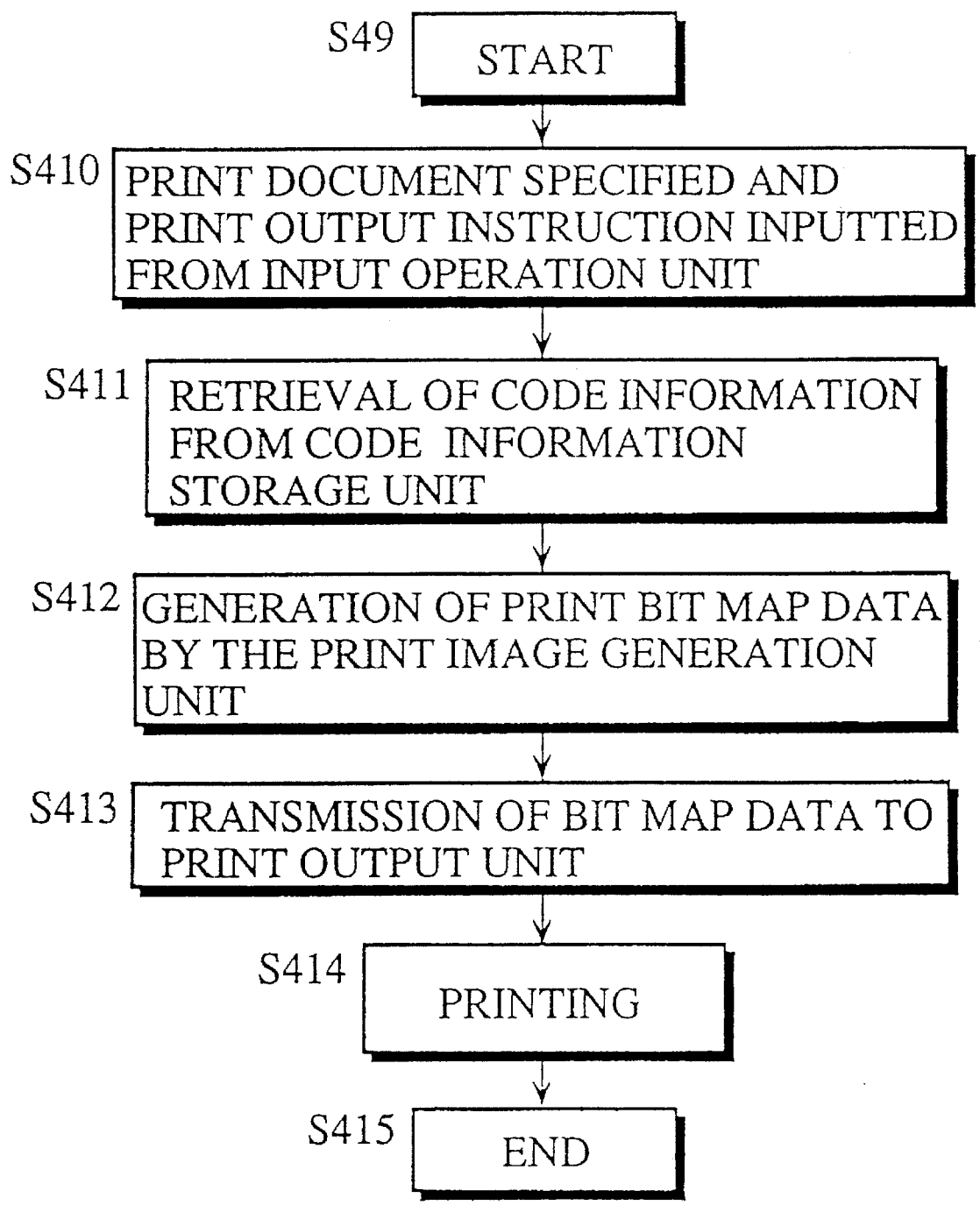
FIG. 4B is a flowchart showing the process of the print output of the document in the present embodiment.

In FIGS. 4A and 4B, flowcharts depicting the creation and storage of the document, and the print output procedure are shown. FIG. 4A shows the procedure for the creation and storage of the document, while FIG. 4B shows the print output procedure. First, the procedure for the creation and storage of the document is shown in FIG. 4A.

S41: the start of the procedure for the creation and storage of the document.

S42: the operator gives the document creation instruction via the input operation unit 11 and the condition whereby a document may be inputted is attained.

S43: the detailed document format to be used when printing the document is inputted using the input operation unit 11. The inputted format information for the document information code is stored in the format information field 21.

S44: characters and tables and figures are inputted with their respective decoration attributes via the input operation unit 11. At this time, the characters and figures are inputted and checked by means of being displayed by the display unit 18 (this display course is not shown in FIG. 1).

S45: the inputted data is converted into code information of the code information format shown in FIG. 2A by the code information generation unit 12.

S46: if the operator has given the storage execution instruction then on to S47. If not, then back to S44.

S47: the generated document information code is transmitted to and stored on the flexible disk used as the code information storage unit 13.

S48: the end of the procedure for the creation and storage of the document.

Next is an explanation of the procedure of the print output of the document shown in FIG. 4B.

S49: the start of the document print output process.

S410: the operator gives the print output instruction, indicating which document is to be printed by means of the identifier (such as a file name, or file number), by means of the input operation unit 11.

S411: the print image generation unit 19 retrieves the information code of the specified document from the code information storage unit 13.

S412: the print image generation unit 19 decides the appearance of the printed image by interpreting the format information field 21 held within the document code information (type of printer paper (A4, A3, B4, B5, free size), paper direction (whether upright or across), the paper size when using free size paper, the maximum number of characters on one line, the number of lines per page, the top, bottom, left, and right margins, the interval between characters, and the interval between lines). Additionally, it generates the character code 23 for every character in the character/character-based line figure field 22.

For characters, the print style character bit map data for the style of character defined by the style of character field 210 for the character given in the character code field 23 is retrieved from the font ROM (with respect to the specified point number for a print output unit of 400 dpi) wherein it is stored. Then, underlining is added in accordance with the kind of underlining field 28, and shading/cross-out lines are added in accordance with the character shading/cross-out line field 29. After that, in determining the character size field 27, characters, including their decoration, are converted into narrow size, or broad size, or tall size, or quadruple size. Following this, every kind of character decoration is executed with regard to the type of character decoration field 212, and finally, the character is rotated with regard to the character rotation field 211. For character-based line figures, the bit map data for every character-sized line segment is generated in accordance with the attributes specifying the line width and the kind of line. Additionally, for the case whereby bit map figure fields are included in the document, then the bit map data of such figures is added on to the bit map data for the print output described above.

S413: the print image generation unit 19 outputs the bit map image data generated for print use to the print output unit 110.

S414: the print output unit 110 prints the document on the printer paper, terminating the procedure (S415).

Although not clearly shown in FIGS. 4A and 4B, it is the control unit 112 which controls the operation of the code information generation unit 12, the code information storage unit 13, the print image generation unit 19, and the print output unit 110.

Figure 5A:
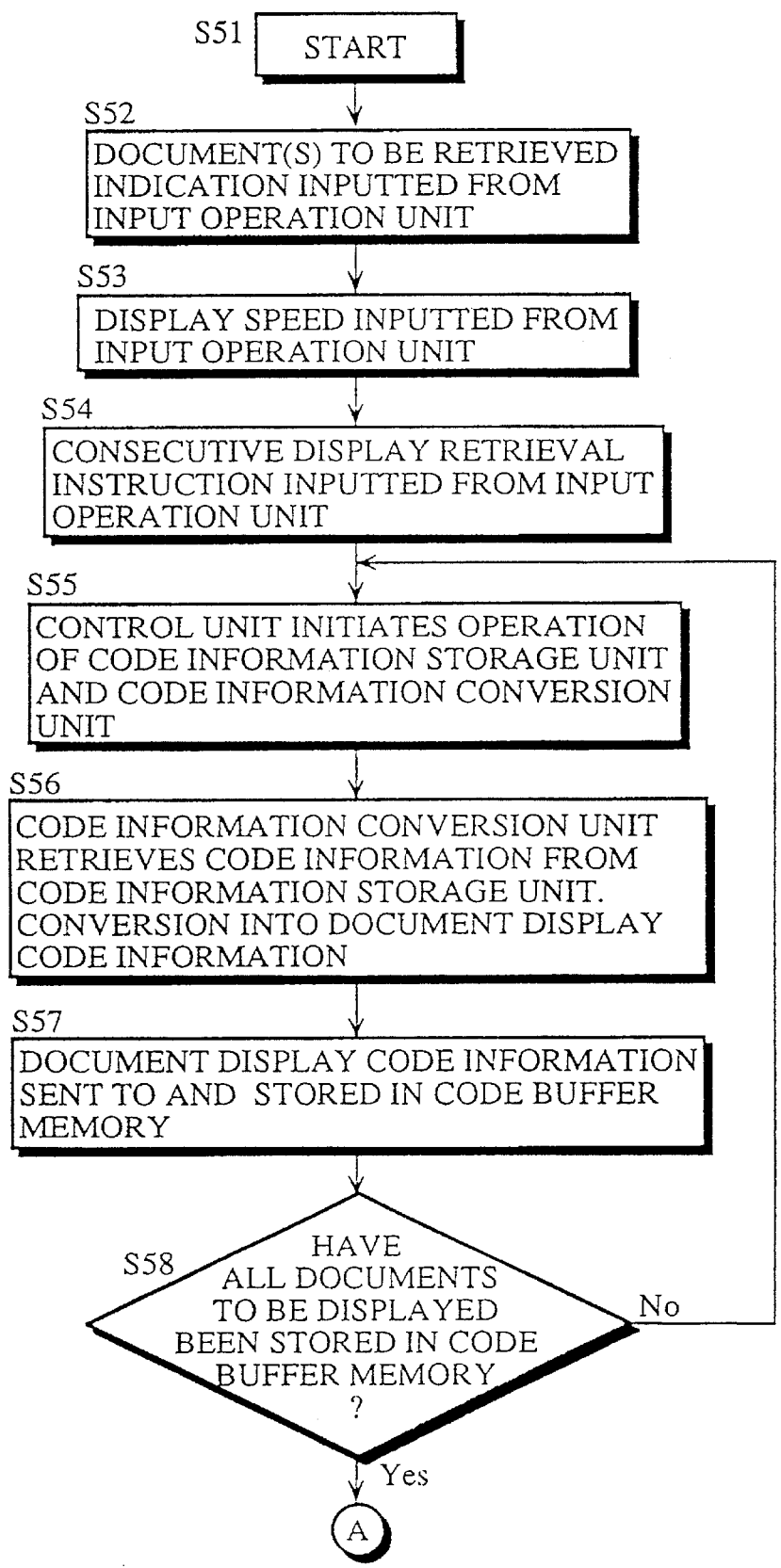
FIG. 5A is a flowchart showing the document retrieval process as far as the stage whereby the document display code information is stored in the buffer memory for the present embodiment.

FIGS. 5A and 5B are flowcharts showing the document retrieval procedure for the present embodiment. The following is an explanation of the consecutive display retrieval procedure shown in these drawings.

S51: the document retrieval process is initiated.

S52: the operator inputs the identifier (folder name or folder number. Here, a folder refers to an amount of text to be managed as a single unit, with a number of documents being able to be handled as a single folder) of the document(s) to be retrieved using the input operation unit 11.

S53: the operator inputs the display speed (that is the reciprocal of the display time for one page of text) by using the input operation unit 11, for the case where using consecutive display document retrieval.

S54: the operator inputs the consecutive display retrieval instruction using the input operation unit 11.

S55: at the input of the consecutive display retrieval instruction, the control unit 112 initiates the operation of the code information storage unit 13 and the code information conversion unit 14.

S56: the initiated code information conversion unit 14 retrieves the code information for the document to be displayed from the flexible disk used as the code information storage unit 13.

After this, the document code information shown in FIG. 2A is converted into document display code information shown in FIG. 3A. In this conversion, for characters, the attribute information of single characters is converted into attribute information for a row of characters (the information stored in the character row information field 33 shown in FIG. 3B). Not only that, all character attributes except character size are deleted, and in their place display position information for each character row is added. Also, character-based line figures often used in drawing tables are treated with their line segments grouped together, and are converted into starting/ending position information. Also, the line width and kind of line are converted so as to conform to one standard kind of line. In this way, the code information can be simplified and hence reduced in size.

The procedure of this step S56 is shown in more detail in FIGS. 7A through 7D.

FIGS. 7A through 7D are flowcharts showing the conversion procedure of the code information retrieved from the flexible disk into the document display information code.

First, having set the flag F showing whether there is bit map data in the document to 0 (S5601), one document is retrieved from the flexible disk (S5602). It is then determined whether a bit map data information field is already prepared for the retrieved document (S5603), with the flag F being set to 1 if there is such a field present (S5605), or being left at 0 if there is none, before moving on to S5607. The character/character-based line figure field (22 in FIG. 2) contained in the document retrieved in S5602 is retrieved, and every character row of characters of the same size, and every grouping of continuous line segments is distinguished in the previously-noted field (S5607). This distinguishing process can be executed in the case of characters by searching the character size 27 in the attribute code field 24 for every character information field, and detecting which characters are of the same size and moreover, which appear in consecutive character information fields. Also, for the case of character-based line figures, the process can be executed by searching the four bits in the character code field 25, and detecting from those 4 bits the character-based line figure information fields made up of line segments which together probably trace one continuous line. Following the procedure of S5607, the variable P which shows the detection number is set at 1 (S5608), and it is determined whether the first character/character-based line figure information field 22 detected above comprises of a character information field (FIG. 2B) or a character-based line figure field (FIG. 2C) (S5609).

If the first detected field is comprised of a character information field, then first the appropriate information is written into the character row information field 33 in the display character row code information field 31 shown in FIG. 3B. Here the character size 35, the character row first character position 36, and the character interval 37 successively make up the appropriate information. The value of the character size found by searching the attribute code information 24 during the detection process (S5607) is used here as it is. The character row first character position is determined by calculating the position of the top-left bit of the first character in the character row when it is written into the display memory unit 17 whilst referring to the contents of the format information field 21. The character interval 37 is also calculated with regard to the character size and the contents of the format information field 21. Once this appropriate information has been written into the character row information field 33 in S5610, the variable n which shows the position of each character within the character row starting from the left is set to 1 (S5611), and then the character code only in the first character information field in the first (P=1) detected field is extracted, and is written into the first character position (S5612) following the character row information field 33 created in S5610. Having entered this information, the variable n is increased by an increment of 1 (S5614), and the character code only for the second character in the first detected field is extracted, and is written into the second position in the character code row field 34 next to the first character which was previously entered (S5612). From here on, this process is executed for all of the character codes in this detected field of characters of the same size (S5613). Having achieved this, the code signalling the end of the character row is added to the end of the character code row (S5615). By means of the above process, the display character row code information for a row of N characters is produced as is shown in FIG. 3B. After this, the detection number P is increased by an increment of 1 (S5617), and the same process is executed for the second detected field.

On the other hand, when the detected field is determined to be a character-based line figure field (S5609), then by searching all of the character-based line figure information fields which comprise the detected field, then the starting and ending positions of each line which make up the character-based line figure are defined, with this information being written into the starting position information field 38 and the ending position information field 39 in the line end point information field 32 in the document display code information (S5617). After this, S5616 and S5617 are executed and the process moves on to handling the next detected field. When all of the code information for one document retrived from the flexible disk has been converted into display character code row information by repeating the process described above (S5616), by referring to the value of the flag F (S5618), the process executes S5606 when F=1, or returns directly to the main flow and executing S57 when F=0.

S57: the converted document display code information is sent to and stored in the code buffer memory unit 15 constructed of semiconductor memory.

S58: S55 to S57 are repeated until all the document display code information for the documents to be retrieved is stored in the code buffer memory 15. If all the information is stored then the process moves on to S59.

S59: the control unit 112 initiates the operation of the timer unit 111, setting the reciprocal of the display speed (=the display time for each document) inputted in S53.

S510: the control unit 112 initiates the operation of the document display generation unit 16.

S511: the initiated document display generation unit 16 retrieves the document display code information for one document from the code buffer memory 15, generates the image data, and transmits this to the display memory unit 17. For the case of characters, it interprets the display character row code information 31 for every character row, and with respect to the stored display standard (for example, a 16 * 16 pixel font: this being the standard font, when quadruple size is specified in the character size field 35 in the character row information field 33, it means that this is the size of font which will be used), retrieves the data from the font ROM and having reduced it, generates the display character row, which it then transmits on to the appropriate position in the display memory unit 17. That is to say, it decides the reduction process method of the standard font ROM data by looking at the character size field 35. For this example, it will reduce characters in the following way, when using standard size, both height and width are halved, for narrow size, width is quartered and height halved, for tall size, width only is halved, for broad size, height only is halved, and for quadruple size, the character is not reduced. Having done this, it reads the first character in the character row and retrieves the font data from the font ROM. After that, it creates the reduced font data according to the process described above, and transmits the data to the position shown by the character row first character position field 36 used as the starting point in the rectangular region (since the addresses in the memory are discontinuous, it is called a rectangular region) in the display memory unit 17. The reduced font data for the second character is created in the same way, and is sent to the position in the rectangular region of the display memory unit 17 given by adding the character interval shown by the character interval field 37 to the position given by the character row first character position field 36.

Hereafter, it repeats the process of creating reduced font data and transmitting it on until the code signalling the end of the character row has been read, at which point one character row is complete. Then, by having repeated this process for only the element parts (=the number of articles in the display character row) of the display character row code information 31, it transmits the character part of the document to the display memory unit 17. After this, it interprets the line end point information field 32 showing the converted character-based line figure information code, and generates the line connecting the starting and ending positions for the number of lines in the document in the display memory unit. Also, when figures constructed as a bit map are present, then it reads the bit map figure frame position and the bit map data from the bit map figure information field which comes after the line end point information fields 32, and transmits this data to the display memory unit 17.

Figure 8A:
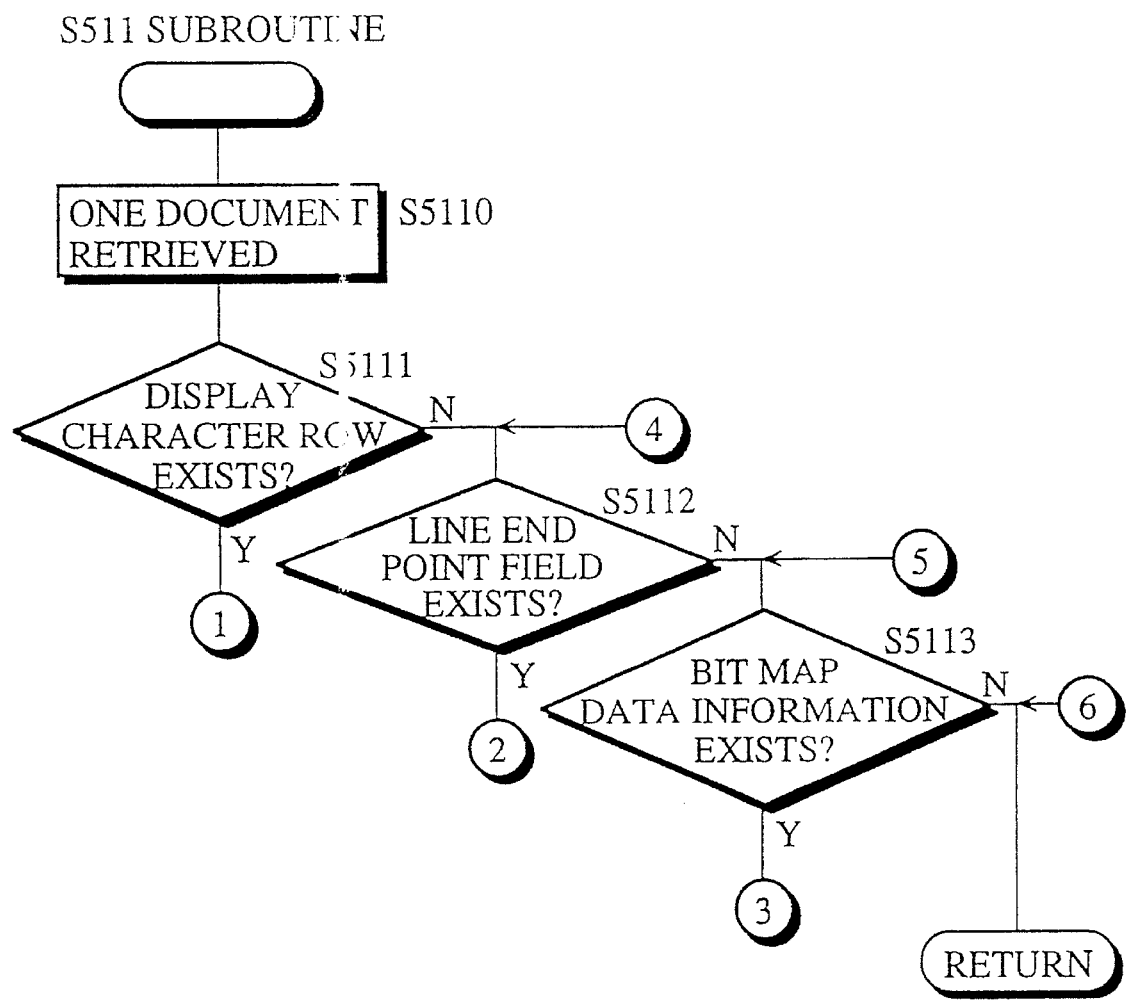
FIGS. 8A–8D are flowcharts showing the subroutines within step S511 in FIG. 5B.
Figure 8B:
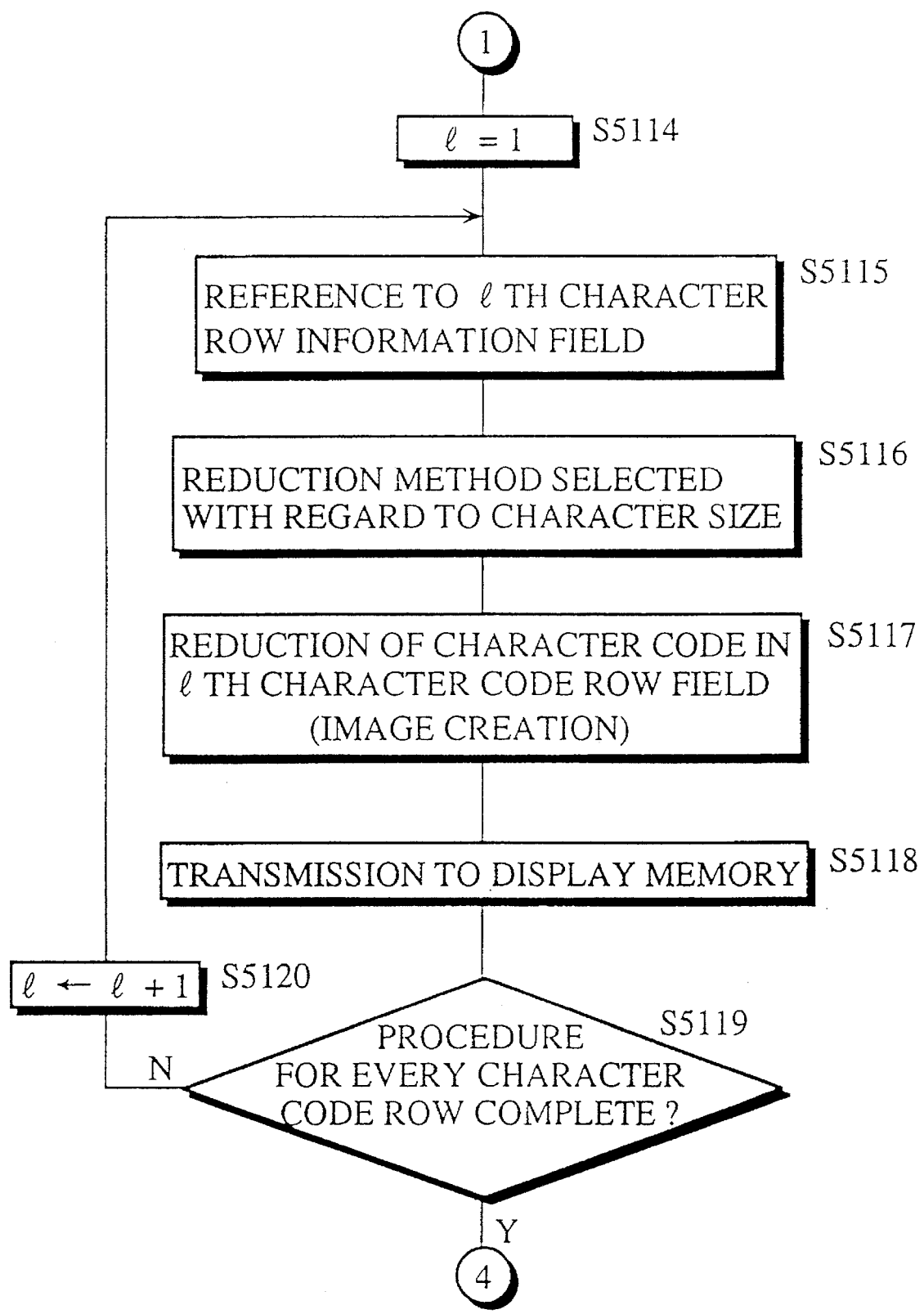
Figure 8C:
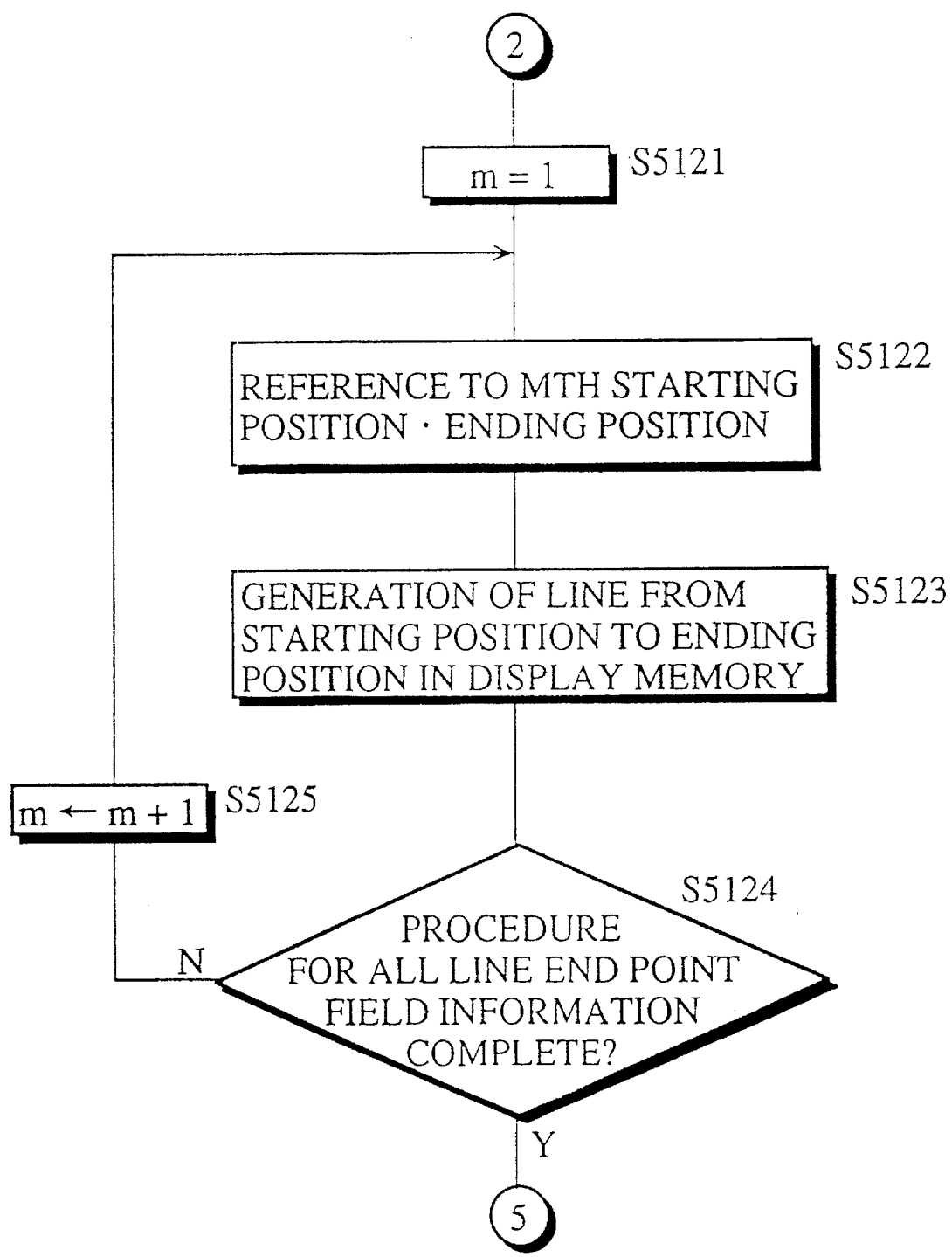
Figure 8D:
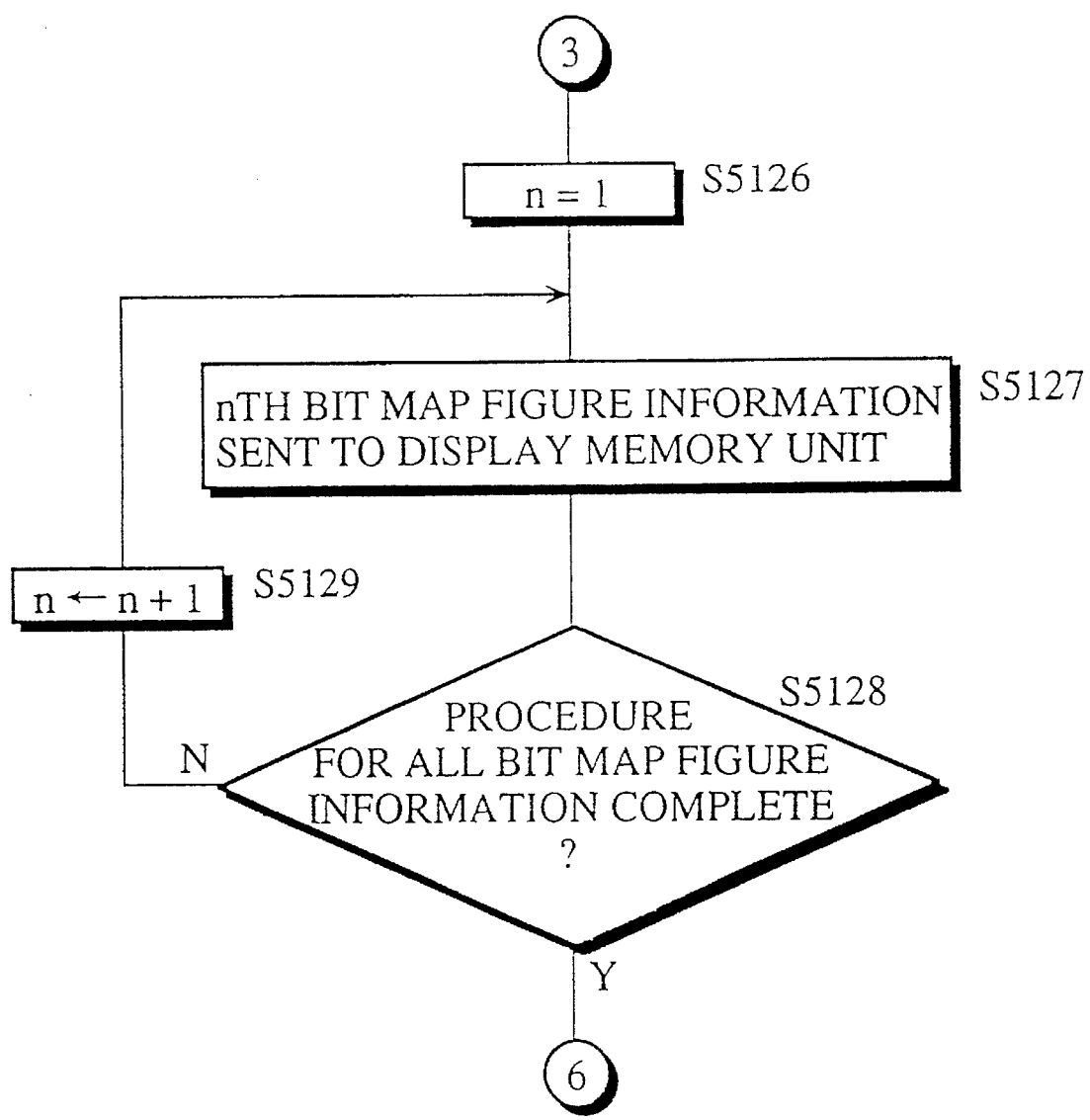

FIGS. 8A through 8D are comprised of flowcharts which depict the above process S511. In FIG. 8A, in S5110 the code information for one document as shown in FIG. 3A is retrieved from the code buffer memory 15. When this code information includes a display character row code information field 31, a line end point information field 32, both shown in FIG. 3A, and bit map data, not shown in the drawing, since they are divided into bit map data fields and fields of different kinds of information, every field is referenced, and when there is a display character row code field 31 (S5111), S5114–S5120 are executed and the character image data is written in to the display memory unit 17. When there is a line end point information field 32(S5112), having completed the execution of the process S5114–S5120 for every display character row code information field, the process S5121 to S5125 is executed and a line connecting the starting and ending positions is drawn in the display memory unit 17. Also, when there is a bit map data information field (S5113), then once the processing of the display character row code fields 31 and the line end point information fields 32 is complete, the process S5126–S5129 is executed, and the bit map data is added to the display memory unit 17. After this, the procedure returns to the main flow and moves on to S512.

S512: the display unit 18 displays the reduced document represented by the data stored in the display memory unit 17.

S513: the operator inputs a terminate document display instruction via the input operation unit 11, or all of the documents have been displayed, thus ending document display, otherwise the procedure moves on to S514.

S514: if the operator inputs a terminate consecutive display instruction using the input operation unit 11, then on to S516, while if not, on to S515.

S515: it is determined whether the set time (this being the display time for one document) in the timer unit 111 has elapsed, with the procedure returning to S513 if it has not, continuing the display of the present document. If it has elapsed, then the procedure move on to S59 and displays the next document.

S516: the procedure waits for the operator to input an instruction via the input operation unit 11 to display either the document preceding or following the document for which the terminate continuous display instruction was received, and moves on to S517 when the instruction is received.

S517: if there has been an instruction to display the document preceding the one for which continuous display was stopped, then the document display generation unit 16 retrieves the document display code information for this preceding document from the code buffer memory 15, and, as with the process in S511, transmits the display image data to the display memory unit 17. This is then displayed by the display unit 18. Also, if there has been an instruction to display the document following the one for which continuous display was stopped, then the display generation unit 16 retrieves the document display code information for this following document from the code buffer memory 15, and, as with the process in S511, transmits the display image data to the display memory unit 17. This is then displayed by the display unit 18.

S518: the operator inputs a terminate document display instruction via the input operation unit 11, or all of the documents have been displayed, thus ending document display.

Figure 6:
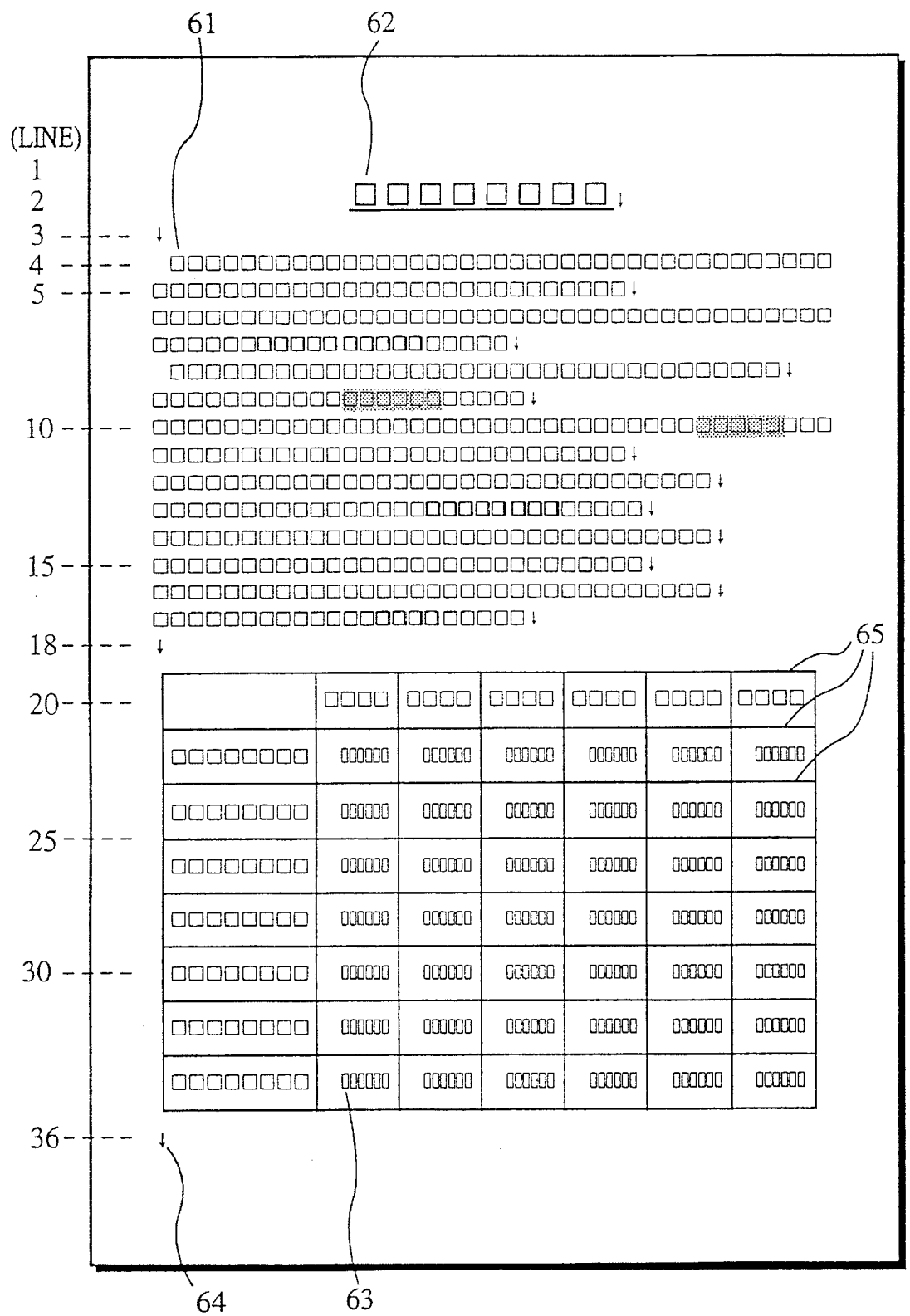
FIG. 6 is a layout drawing showing the construction of an example document used to show the extent to which the document information size is reduced when the code information conversion unit takes the code information for the characters and character-based line figures in the document and converts it into document display code information for the present embodiment.
Figure 7A:
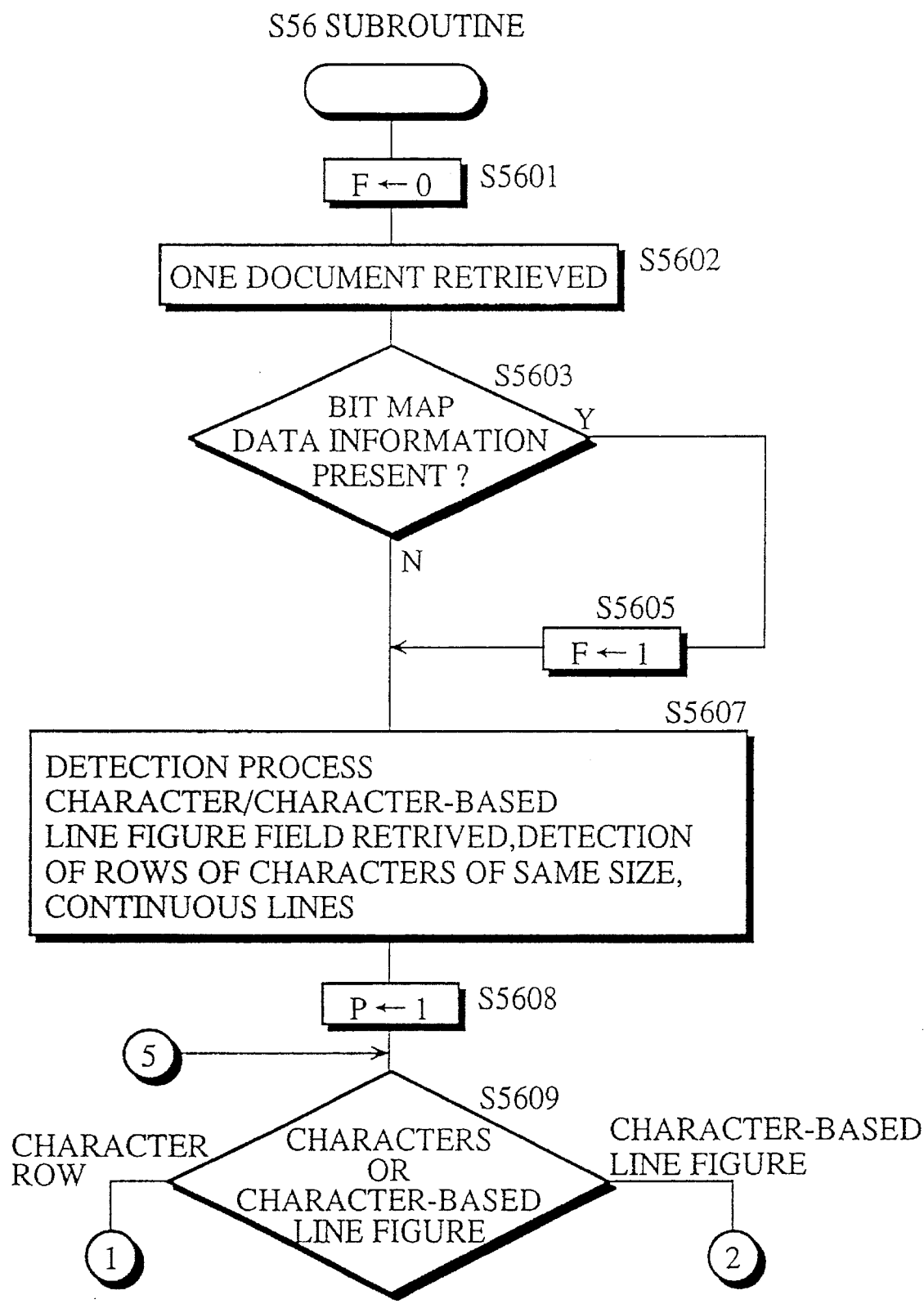
FIGS. 7A–7D are flowcharts showing the subroutines within step S56 in FIG. 5A.
Figure 7B:
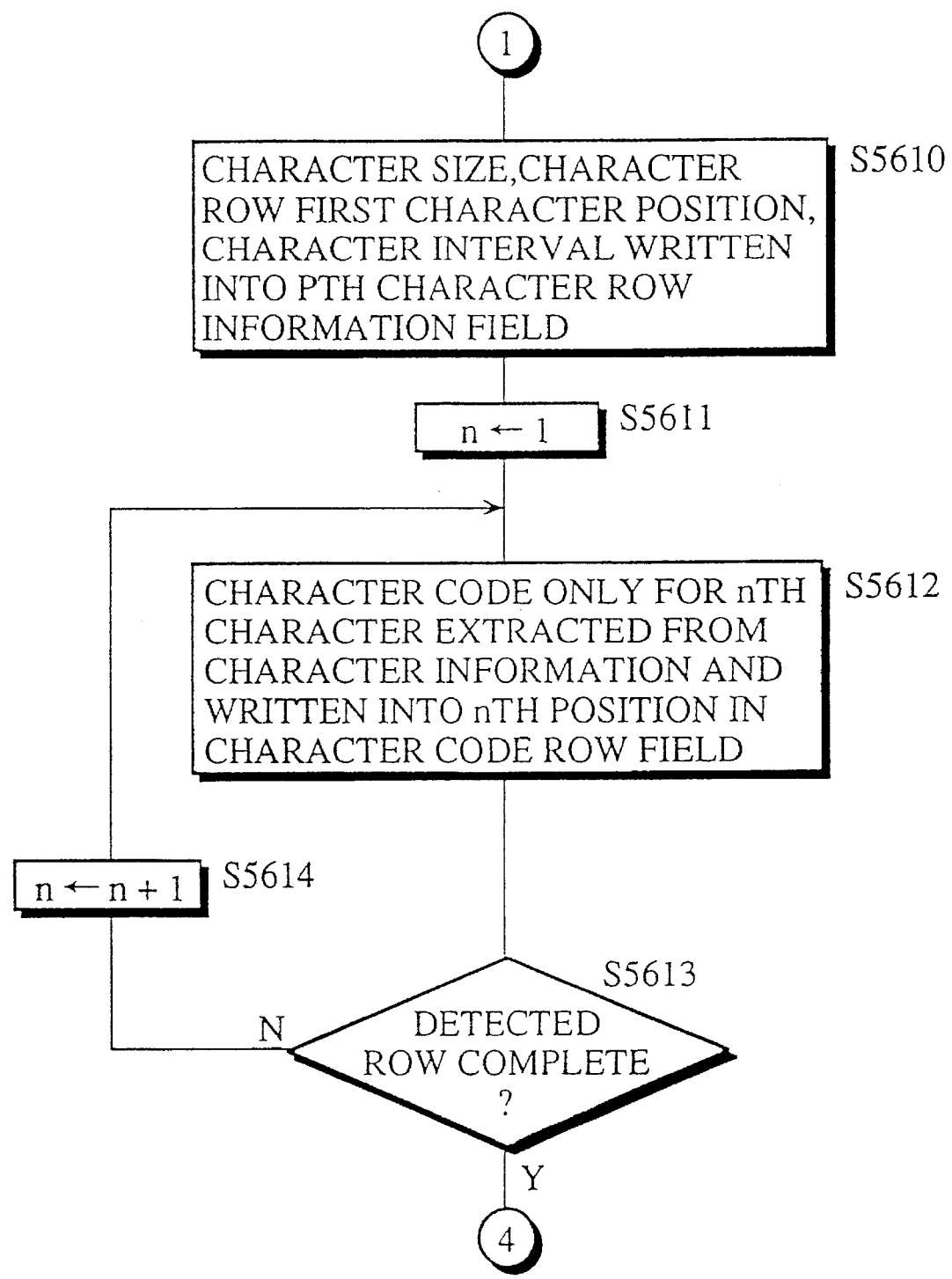
Figure 7C:
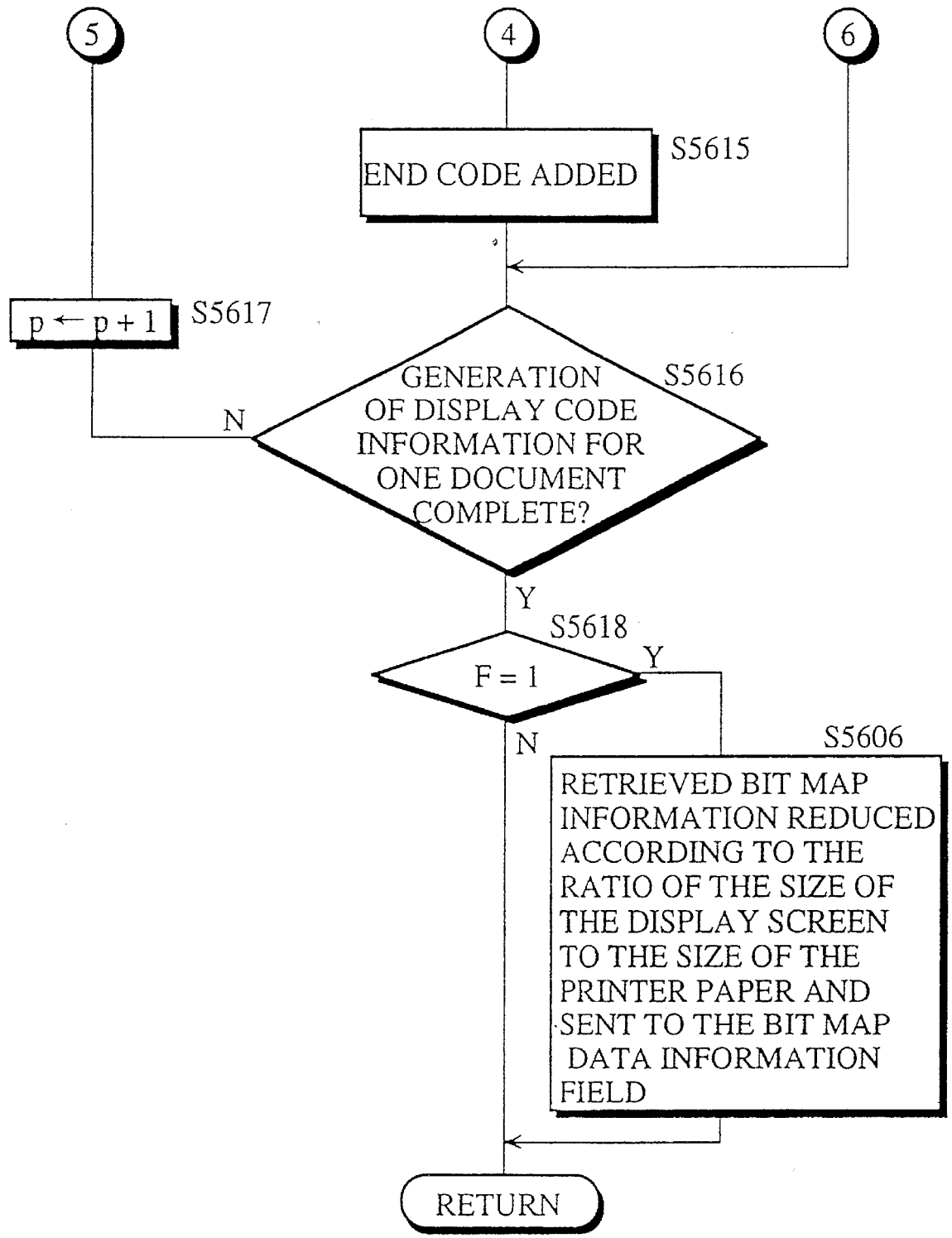
Figure 7D:
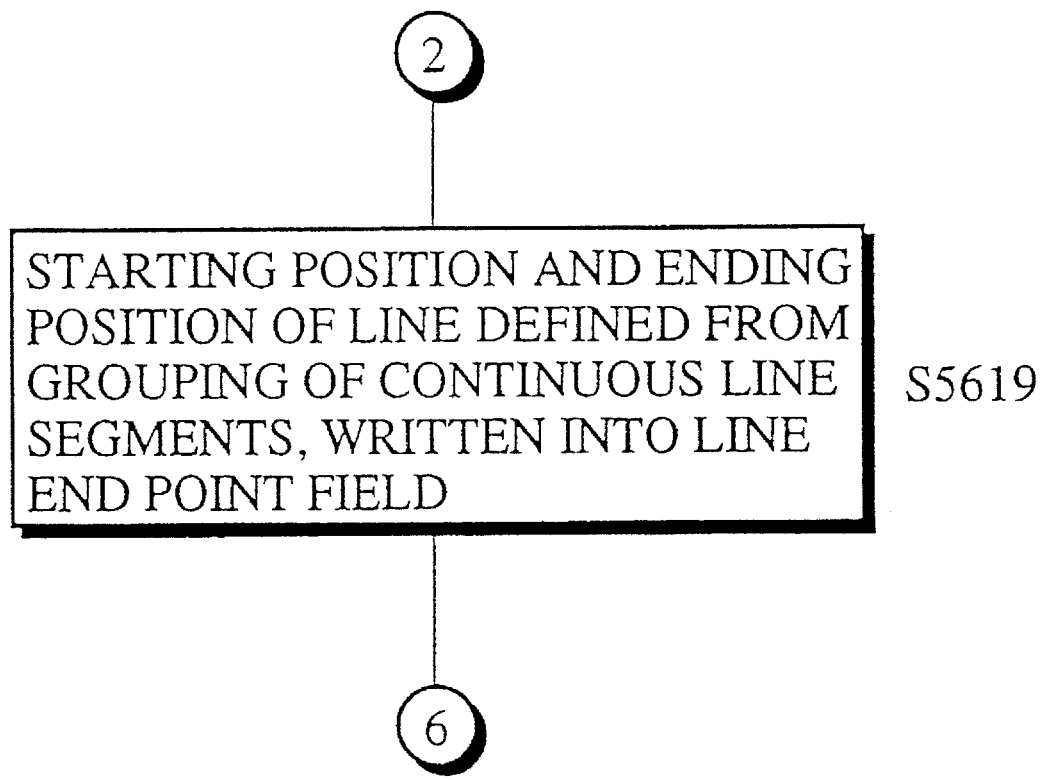

The following is a more concrete explanation, using FIG. 6, to show to what extent code size is reduced when the code information conversion unit 14 in the present embodiment converts character code information for characters and character-based line figures into document display code information. FIG. 6 is a layout drawing showing the typical composition of an example document to be used in the following explanation. In this drawing, 61 is the symbol indicating one standard size character. In reality, one character in the document, whether a Roman letter, a numeral, a Japanese hiragana character or a Chinese character, is placed in the position indicated by these symbols. 62 is the symbol indicating one quadruple size character. In the real document, quadruple size roman letters or numerals, Japanese hiragana, Chinese characters etc. are placed in the positions shown by these symbols. 63 is the symbol indicating one narrow size character. 64 is the symbol which indicates a new line, which is not printed when executing the print output. 65 is the symbol indicating a character-based line figure. The composition of this example document is set up in the following way. There are a maximum of 40 characters on one line, with a page of standard characters (quadruple characters are treated as to equal four standard characters) consisting of 36 lines. From line 1 considered as being made up of standard characters to line 18, there are only characters, while from line 19 onwards there is a table made up as a character-based line figure. Lines 1 and 2 (thought of as standard characters) comprise of 8 quadruple size characters which are also underlined. Lines 1 and 2 also feature six quadruple size spaces from character 1 to 6. Line 3 is an empty line, and so only features a new line code.

Line 4 has a space as character 1. From character 2 to character 40, in fact continuing as far as character 28 in line 5, every space is a character. Character 29 on line 5 contains a new line code.

Standard size characters continue from line 6 to character 21 of line 7, with characters 7 to 16 in line 7 having the character decoration of being in bold type.

Line 8 has a space as character 1, and from there contains 36 characters.

Line 9 has 22 characters, among them characters 12 to 17 featuring shading.

Standard size characters continue from line 10 to the 28th character of line 11, with characters 33 to 37 in line 10 featuring shading.

Line 12 is comprised of 33 characters.

Line 13 is comprised of 29 characters, among them characters 17 to 24 being in bold type.

Line 14 is comprised of 33 characters.

Line 15 is comprised of 29 characters.

Line 16 is comprised of 33 characters.

Line 17 is comprised of 22 characters, among them characters 14 to 17 being in bold type.

Line 18 is an empty line, and so only features a new line code.

Line 19 is comprised of a character-based line figure. Character 1 is made up of a down line and a right line, characters 10, 15, 20, 25, 30, and 35 are comprised of down lines, and left and right lines, character 40 is comprised of a down line and a left line, while the other characters in the line are made up of a left and a right line.

Line 20 is comprised of characters and a character-based line figures. Characters 1, 10, 15, 20, 25, 30, 35, and 40 are character-based line figures comprised of an up and a down line. The rest of the line is made up of characters, with characters 2 to 9 all being spaces. Characters 11 to 14, 16 to 19, 21 to 24, 26 to 29, 31 to 34, and 36 to 39 are all made up of 4 standard characters respectively.

Line 21 is comprised of a character-based line figure.

Line 22 is comprised of characters and a character-based line figures. Characters 1, 10, 15, 20, 25, 30, 35, and 40 are character-based line figures comprised of an up and a down line. The rest of the line is made up of characters, with characters 2 to 9 being made up of 8 standard characters. Characters 11 to 14, 16 to 19, 21 to 24, 26 to 29, 31 to 34, and 36 to 39 are all made up of two narrow size character spaces, and 6 narrow characters, respectively.

Line 23 is comprised of a character-based line figure.

Lines 24, 26, 28, 30, 32, and 34 are all constructed in the same way as line 22.

Lines 25, 27, 29, 31, 33, and 35 are all constructed in the same way as line 23.

Line 36 is an empty line.

The following is a calculation of the size of the code information size stored in the character/character-based line figure field 22 for the code information equated to the document constructed as above.

Converting into standard characters, then for lines 1 and 2, including spaces and new line symbols, the code data for 15 characters is necessary, making a total of 60 bytes (4 bytes*15).

Line 3 features only a new line symbol, hence requires 4 bytes.

Line 4 to 5, including a space and a new line signal, contain 69 characters, making a total of 276 bytes.

From there to line 18, under the same calculations, lines 6 to 7 require 248 bytes, line 8 requires 152 bytes, line 9 requires 92 bytes, lines 10 and 11 require 276 bytes, line 12 requires 136 bytes, line 13 requires 120 bytes, line 14 requires 136 bytes, line 15 requires 120 bytes, line 16 requires 136 bytes, line 17 requires 92 bytes, and line 18 requires 4 bytes.

In line 19, code information for every character from 1 to 40 is necessary, making a total of 160 bytes.

Line 20 includes characters, but in the same way makes a total of 160 bytes.

Every character in line 21 is a character-based line figure, making a total of 160 bytes.

Line 22 is comprised of 16 standard characters and 8*6 narrow size characters making a total of 64 characters, and hence 256 bytes.

Every character in line 23 is a character-based line figure, making a total of 160 bytes.

In the same way as line 22, lines 24, 26, 28, 30, 32, and 34 each require 256 bytes.

In the same way as line 23, lines 25, 27, 29, 31, 33, and each require 160 bytes.

As an empty line, line 36 requires just 4 bytes.

Including the 88 bytes of the format information field, these figures add up to a total of 5,336 bytes=42,688 bits.

The following is a calculation of the size of the document display code information generated by the code information conversion unit 14. In the document display code information, row of characters of the same size and same character interval are gathered together, with the characters being defined as one element in the display character row code information field.

Under the conversion to standard characters, since lines 1 and 2 are comprised of 8 quadruple size characters, then, including the code which signifies the end of the character row, character code for 9 characters is necessary in the character code row field 34 in the display character row code information field 31. Therefore, including the character row information field 33 featuring the character size showing quadruple size, the character row first character position showing the position of the top left bit of the first quadruple character in the row, and the character interval, a total of 175 bits are required. The underlining featured in this line is not shown when the document is displayed.

Line 3 is an empty line, so document display code information is not necessary.

Since line 4 is comprised of a character row of 40 standard characters, then, including the code which signifies the end of the character row, character code for 40 characters (the space is not necessary) is necessary in the character code row field 34 in the display character row code information field 31. Therefore, including the character row information field 33 featuring the character size showing standard size, the character row first character position showing the position of the top left bit of the first standard character in the row, and the character interval, a total of 671 bits are required.

The following is the memory requirements of lines 5 to 18 calculated in the same way as above for each line.

Line 5 comprises 495 bits. Line 6 comprises 687 bits.
Line 7 comprises 383 bits. Line 8 comprises 623 bits.
Line 9 comprises 399 bits. Line 10 comprises 687 bits.
Line 11 comprises 495 bits. Line 12 comprises 575 bits.
Line 13 comprises 511 bits. Line 14 comprises 575 bits.
Line 15 comprises 511 bits. Line 16 comprises 575 bits.
Line 17 comprises 399 bits. Line 18 comprises 0 bits.

The attributes such as bold type and shading featured in these lines are not shown on the display. From line 19 onwards, character rows and lines are mixed. First, calculating the size of the converted code information of the character rows in line 20, character rows consisting of characters 11 to 14, 16 to 19, 21 to 24, 26 to 29, 31 to 34, and 36 to 39 each comprise of 111 bits of code information. In line 22, the character row from character 2 to character 9 comprises 175 bits of code information, while the 6 character rows of narrow size characters each comprise 143 bits of code information.

Lines 24, 26, 28, 30, 32, and 34 are feature character rows in the same way as line 22.

Additionally, the character-based line figure which is featured in lines 19 onwards is made up of 9 horizontal and 8 vertical lines. Therefore the necessary end point information field 32 consists of (18+18)*(9+8)=612 bits. In the document display, all lines are shown as solid lines.

Therefore, the size of the document display code information comes to a total of 16270 bits.

That is to say, by means of the code conversion by the code information conversion unit 14, as much as 62% of the amount of code information can be erased, and by using a code buffer memory of a certain size, the document display code for more documents can be buffered.

Also, in the above embodiment, the attribute code for characters and character-based line figures was given as comprising 16 bits of additional information, as shown in FIGS. 2B and 2C, but even when the attribute code exceeds 16 bits, the same results can be achieved.

Additionally, in the above embodiment, the case whereby, out of all of the character attributes, only character size is taken as valid in the character display code information is shown, but if there is another character attribute which is the same for every character in a character row, then the same result can be achieved by using this attribute as well.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being include therein.

What is claimed is:

1. A word processor unit capable of converting a document which has been stored in the form of code information into image data for a print output and of print outputting said converted document, comprising:

input means for inputting an operator's document display instructions;

document storage means for storing a document as a collection of character information, said character information being made up of a combination of a character code and attribute information for each character unit which is a united form;

retrieval means for retrieving the character information from the document storage means;

display character code conversion means for performing a process which extracts character codes from the character information retrieved by the retrieval means for the character information read in order by the retrieval means, for detecting character code rows which are sets of extracted character codes for which a selected attribute is identical, for adding the selected attribute to each detected character code row and for outputting the appended character code rows has display character code rows;

a code buffer memory for storing the display character code rows;

display image generation means for retrieving the display character code rows from the code buffer memory and generating display image data;

display means for displaying the generated display image data; and control means for activating, when document display instructions have been inputted, the retrieval means to retrieve the document from the document storage means, activating the display character code conversion means to convert the document into display character code rows to be stored in the code buffer memory, and activating the display image generation means to generate the display image data at a specified speed and to display a display image.

2. The word processor unit of claim 1, wherein the control means includes a timer for establishing a generation time interval of a document display image, and performs control to have a display image of a following document generated whenever the time interval in the timer has elapsed.

3. The word processor unit of claim 2, further comprising display speed input means for enabling an operator to specify a display speed for when the document is displayed, and wherein the timer establishes the time interval in accordance with a value given by the operator via the display speed input means.

4. The word processor unit of claim 3, wherein the display character code conversion means includes:

a group division processing unit for dividing a retrieved set of code information into groups, a group being a set of information to be displayed consecutively for which a selected attribute is identical; and a display code row generation unit for generating display character code information made up of only the character codes extracted from the set of character information for every group arranged into a display order, and the identical attribute information within the group.

5. The word processor unit of claim 4, wherein the group division processing unit includes a retrieval unit for retrieving a set of character information for which character size is identical, by referring to attribute information, out of the character information retrieved by the retrieval means from the document storage means, when the attribute to be used by the group division processing unit in forming the groups is specified as character size.

6. The word processor unit of claim 5, wherein the display code row generation unit includes an attribute information generation unit which generates as attribute information to be added to an array of character codes, information showing a character size for a character row, and for when the character row is displayed, information showing a display starting position and character interval information.

7. The word processor unit of claim 6, wherein the document storage means is comprised of a magnetic disk; and the retrieval means is comprised of a magnetic disk head.

8. The word processor unit of claim 1, wherein the input means includes a first operation unit for specifying a group of display documents, a second operation unit for handling an indication for consecutive display, and a third operation unit for handling a display of one document only, and wherein the control means includes:

a first reference unit for referring as to whether there has been an indication specifying a group of display documents and a consecutive display indication created through an operation of the first operation unit and the second operation unit;

a first control unit for initiating, only when instructed by the first reference unit, the retrieval means and the display character code conversion means, having the group of display documents retrieved from the document storage means, and having the generated display character code rows stored in the code buffer memory; and a second control unit for having the display image generation means initiated once the group of display documents have been stored in the code buffer memory, and having the display code character rows of the documents retrieved consecutively for each separate document in order from the code buffer memory and then displayed by the display means.

9. The word processor unit of claim 8, wherein the control means further includes:

a second reference unit for referring to whether the third operation unit is operated during the consecutive document display; and a third reference unit for referring to whether the third operation unit is operated after the consecutive document display has been terminated, and wherein the second control unit controls a termination of the consecutive document display at an indication from the second reference unit, and controls, at an indication from the third reference unit, an initiation of the display image generation means, having the display character code rows in the group of display documents retrieved for one document at a time from the code buffer memory, then the display character image generated and displayed.

10. The word processor unit of claim 9, wherein the input means further includes a fourth operation unit for inputting a display complete indication, whereby the second control unit terminates retrieval when the display complete indication is inputted from the fourth operation unit during the consecutive display operation, and has a document which was being displayed when the display complete indication was inputted continued being shown.

11. The word processor unit of claim 10, wherein the control means includes a timer for establishing a generation time interval of a document display image, to have a display image of a following document generated whenever the time interval in the timer has elapsed.

12. The word processor unit of claim 11, further comprising display speed input means for enabling an operator to specify a display speed for when the document is displayed, and wherein, the timer establishes the time interval in accordance with a value given by the operator via the display speed input means.

13. The word processor unit of claim 12, wherein the display character code conversion means includes:

a group division processing unit for dividing a retrieved set of code information into groups for which a specified attribute is identical and which are to be displayed consecutively; and a display code row generation unit for generating display character code information made up of only the character codes extracted from the set of character information for every group arranged into a display order, and the identical attribute information within the group.

14. The word processor unit of claim 13, wherein the group division processing unit includes a retrieval unit for retrieving a set of character information for which character size is identical, by referring to attribute information, out of the character information retrieved by the retrieval means from the document storage means, when the attribute to be used by the group division processing unit in forming the groups is specified as character size.

15. The word processor unit of claim 14, wherein the display code row generation unit includes an attribute information generation unit which generates as attribute information to be added to an array of character codes, information showing a character size for a character row, and for when the character row is displayed, information showing a display starting position and character interval information.

16. The word processor unit of claim 1, wherein the document stored in the document storage means includes figures as well as characters, with the figures being comprised of a combination of character-based line figures, each element being a size of one character, with figure information for every character-based line figure being comprised of a combination of a figure code and an attribute code, and wherein the word processor unit further comprises:

character/figure determination means for referring to the character/figure information retrieved by the retrieval means and determining whether the character/figure information is character information or figure information, and, when the character/figure information is the character information, having the retrieved data sent on to the display character code conversion means; and display figure code conversion means for detecting a set of figure information which describes one continuous line out of the retrieved data determined to be the figure information by the character/figure determination means, and at same time seeking out end points of a line described by the figure information, and generating starting position information and ending position information as a display figure code, whereby the code buffer memory stores the display figure code in a different field to the display character code.

17. The word processor unit of claim 16, wherein the control means includes a timer for establishing a generation time interval of a document display image, to have a display image of a following document generated whenever the time interval in the timer has elapsed.

18. The word processor unit of claim 17, further comprising display speed input means for enabling an operator to specify a display speed for when the document is displayed, and wherein the timer establishes the time interval in accordance with a value given by the operator via the display speed input means.

19. The word processor unit of claim 18, wherein the input means includes a first operation unit for specifying a group of display documents, a second operation unit for handling an indication for consecutive display, and a third operation unit for handling a display of one document only, and wherein the control means includes:

a first reference unit for referring as to whether there has been an indication specifying a group of display documents and a consecutive display indication created through an operation of the first operation unit and the second operation unit;

a first control unit for initiating, only when instructed by the first reference unit, the retrieval means, the display character code conversion means, and the display figure code conversion means, having the group of display documents retrieved from the document storage means, and having the generated display character code rows and/or generated display figure code rows stored in the code buffer memory; and a second control unit for having the display image generation means initiated once the group of display documents have been stored in the code buffer memory, and having the display code character rows and/or the display figure code rows of the documents retrieved consecutively for each separate document in order from the code buffer memory and then displayed by the display means.

20. The word processor unit of claim 19, wherein the control means further includes:

a second reference unit for referring to whether the third operation unit is operated during the consecutive document display; and a third reference unit for referring to whether the third operation unit is operated after the consecutive document display has been terminated, and wherein the second control unit controls a termination of the consecutive document display at an indication from the second reference unit, and controls, at an indication from the third reference unit, an initiation of the display image generation means, having the display character code rows and/or the display figure code rows in the group of display documents retrieved for one document at a time from the code buffer memory, then the image data for display use generated and displayed.

21. The word processor unit of claim 20, wherein the input means further includes a fourth operation unit for inputting a display complete indication, whereby the second control unit terminates retrieval when the display complete indication is inputted from the fourth operation unit during the consecutive display operation, and has a document which was being displayed when the display complete indication was inputted continued being shown.

22. A word processor unit capable of converting documents which have been stored in the form of code information into image data for a print output, comprising:

input means for having a display indication specifying a group of documents to be displayed inputted;

document storage means for storing accumulated character information which is a unified form of a character code and an attribute code for each character in a document;

retrieval means for retrieving character information from the document storage means;

display character code conversion means for detecting character rows, extracting the character codes from the character information successively retrieved by the retrieval means, for which a specified attribute exhibits an identical value, adding the respective identical attribute value to each of the detected character rows, and outputting display character code rows;

code buffer memory for storing the display character code rows;

first control means for initiating, when there is a display indication from an operator, the retrieval means, and the display code conversion means, having all of the documents specified to be displayed by the operator retrieved from the document storage means, converted into display character code and stored in the code buffer memory;

display image generation means for retrieving the display character code from the code buffer memory and generating display image data;

display means for displaying the generated display image data; and second control means for initiating the display image generation means and the display means once a predetermined amount of display character codes has been stored in the code buffer memory, and having the display image data displayed at a specified speed.

23. The word processor unit of claim 22, wherein second control means includes an observation unit for observing whether all of the data for the set of documents specified by the operator to be displayed has been stored in the code buffer memory, and initiating the display image generation means when all of the data for the documents to be displayed has been stored.

24. The word processor unit of claim 23, wherein the second control means further includes a timer for establishing a generation time interval of a document display image, to have a display image of a following document generated whenever the time interval in the timer has elapsed.

25. The word processor unit of claim 24, further comprising display speed input means for enabling an operator to specify a display speed for when the document is displayed, and wherein the timer establishes the time interval in accordance with a value given by the operator via the display speed input means.

26. The word processor unit of claim 25, wherein the input means includes a first operation unit for specifying a group of display documents, a second operation unit for handling an indication for consecutive display, and a third operation unit for handling a display of one document only, and wherein the first control means includes:

a first reference unit for referring as to whether there has been an indication specifying a group of display documents and a consecutive display indication created through an operation of the first operation unit and the second operation unit; and wherein the first control means initiates, only when instructed by the first reference unit, the retrieval means and the display character code conversion means, having the group of display documents retrieved from the document storage means, and having the generated display character code rows stored in the code buffer memory; and wherein the second control means has the display image generation means initiated once the group of display documents have been stored in the code buffer memory, and having the display code character rows of the documents retrieved consecutively for each separate document in order from the code buffer memory and then displayed by the display means.

27. The word processor unit of claim 26, wherein the second control means further includes:

a second reference unit for referring to whether the third operation unit is operated during the consecutive document display; and a third reference unit for referring to whether the third operation unit is operated after the consecutive document display has been terminated, and wherein the second control means controls a termination of the consecutive document display at an indication from the second reference unit, and controls, at an indication from the third reference unit, an initiation of the display image generation means, having the display character code rows in the group of display documents retrieved for one document at a time from the code buffer memory, then the display character image generated and displayed.

28. The word processor unit of claim 27, wherein the input means further includes a fourth operation unit for inputting a display complete indication, whereby the second control means terminates retrieval when the display complete indication is inputted from the fourth operation unit during the consecutive display operation, and has a document which was being displayed when the display complete indication was inputted continued being shown.

29. The word processor unit of claim 25, wherein the document stored in the document storage means includes figures as well as characters, with the figures being comprised of a combination of character-based line figures, each element being a size of one character, with figure information for every character-based line figure being comprised of a combination of a figure code and an attribute code, and wherein the word processor unit further comprises:

character/figure determination means for referring to the character/figure information retrieved by the retrieval means and determining whether the character/figure information is character information or figure information, and, when the character/figure information is the character information, having the retrieved data sent on to the display character code conversion means; and display figure code conversion means for detecting a set of figure information which describes one continuous line out of the retrieved data determined to be the figure information by the character/figure determination means, and at same time seeking out end points of a line described by the figure information, and generating starting position information and ending position information as a display figure code, whereby the code buffer memory stores the display figure code in a different field to the display character code.

30. The word processor unit of claim 29, wherein the input means includes a first operation unit for specifying a group of display documents, a second operation unit for handling an indication for consecutive display, and a third operation unit for handling a display of one document only, and wherein the first control means includes:

a first reference unit for referring as to whether there has been an indication specifying a group of display documents and a consecutive display indication created through an operation of the first operation unit and the second operation unit;

a first control unit for initiating, only when instructed by the first reference unit, the retrieval means, the display character code conversion means, and the display figure code conversion means, having the group of display documents retrieved from the document storage means, and having the generated display character code rows and the generated display figure code rows stored in the code buffer memory; and a second control unit for having the display image generation means initiated once the group of display documents have been stored in the code buffer memory, and having the display code character rows and/or the display figure code rows of the documents retrieved consecutively for each separate document in order from the code buffer memory and then displayed by the display means.

31. The word processor unit of claim 30, wherein the first control means further includes:

a second reference unit for referring to whether the third operation unit is operated during the consecutive document display; and a third reference unit for referring to whether the third operation unit is operated after the consecutive document display has been terminated, and wherein the second control unit controls a termination of the consecutive document display at an indication from the second reference unit, and controls, at an indication from the third reference unit, an initiation of the display image generation means, having the display character code rows and/or the display figure code rows in the group of display documents retrieved for one document at a time from the code buffer memory, then the display image data generated and displayed.

32. The word processor unit of claim 31, wherein the input means further includes a fourth operation unit for inputting a display complete indication, whereby the second control unit terminates retrieval when the display complete indication is inputted from the fourth operation unit during the consecutive display operation, and has a document which was being displayed when the display complete indication was inputted continued being shown.

33. A word processor unit for displaying at high speed documents which had been input with code information and which can prim high quality images of the inputted documents, comprising:

input means for inputting an operator's document display instructions;

document storage means for storing a document as a collection of character information, said character information comprising a combination of a character code and an attribute information for each character in the document:

retrieval means for retrieving the character information from the document storage means;

display character code conversion means for extracting character codes from the character information retrieved by the retrieval means, for detecting character code rows which are sets of extracted character codes for which a selected attribute is identical, for adding the selected attribute to each detected character code row and for outputting the appended character code rows as display character code rows;

a code buffer memory for storing the display character code rows;

display image generation means for retrieving the display character code rows from the code buffer memory and generating display image data;

display means for displaying the generated display image data;

control means for activating, when document display instructions have been inputted, the retrieval means to retrieve the document from the document storage means, activating the display character code conversion means to convert the document into display character code rows to be stored in the code buffer memory, and activating the display image generation means to generate the display image data at a specified speed and to display a display image; and a print image generation means for generating a print image of a document stored in the document storage means, wherein the print image is generated from all the operator's document display instructions.

* * * * *